(12) United States Patent
Heeb et al.

(10) Patent No.: US 9,618,735 B2
(45) Date of Patent: Apr. 11, 2017

(54) MICROSCOPE WITH OBJECTIVE-DEPENDENT LIMITATION OF THE ROTATION ANGLE OF THE ZOOM ROTARY WHEEL

(71) Applicant: LEICA MICROSYSTEMS (SCHWEIZ) AG, Heerbrugg (CH)

(72) Inventors: Rouven Heeb, Gams (CH); Harald Schnitzler, Lüchingen (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 14/873,519

(22) Filed: Oct. 2, 2015

(65) Prior Publication Data

US 2016/0097922 A1 Apr. 7, 2016

(30) Foreign Application Priority Data

Oct. 6, 2014 (DE) .................. 10 2014 114 465

(51) Int. Cl.
*G02B 21/00* (2006.01)
*G02B 21/02* (2006.01)
(Continued)

(52) U.S. Cl.
CPC .......... *G02B 21/025* (2013.01); *G02B 7/105* (2013.01); *G02B 7/14* (2013.01); *G02B 21/24* (2013.01);
(Continued)

(58) Field of Classification Search
CPC . G02B 7/00; G02B 7/003; G02B 7/02; G02B 7/021; G02B 7/023; G02B 7/026;
(Continued)

(56) References Cited

U.S. PATENT DOCUMENTS 4,078,857 A * 3/1978 Kantner ................. G02B 13/18
359/699
4,643,540 A * 2/1987 Kawasaki .............. G02B 21/00
359/363
(Continued)

FOREIGN PATENT DOCUMENTS

DE 20207284 U1 8/2002
DE 102010030637 A1 12/2011
DE 102013201632 A1 7/2014

*Primary Examiner* — Arnel C Lavarias
(74) *Attorney, Agent, or Firm* — Hodgson Russ LLP

(57) ABSTRACT

A microscope (10) includes an objective system (30) and a zoom system (32). The microscope (10) furthermore has a manually rotatable rotary wheel (108) for adjusting the magnification of the zoom system (32), the rotary wheel (108) being rotatable within a predetermined maximum rotation range. The rotary wheel (108) includes a first engagement element (162, 164). In addition, at least one second engagement element (130 to 136) is movably mounted on a housing (100) of the microscope (10). This second engagement element (130 to 136) is movable between a deactivated and an activated position, being in engagement with the first engagement element (162, 164) in an activated position. The position of the second engagement element (130 to 136) is determined by the respective objective (44, 52) currently received in the beam path.

15 Claims, 19 Drawing Sheets

(51) Int. Cl.
*G02B 21/24* (2006.01)
*G02B 21/36* (2006.01)
*G02B 7/105* (2006.01)
*G02B 7/14* (2006.01)

(52) U.S. Cl.
CPC ......... *G02B 21/361* (2013.01); *G02B 21/362* (2013.01)

(58) Field of Classification Search
CPC ... G02B 7/04; G02B 7/09; G02B 7/10; G02B 15/00; G02B 15/14; G02B 15/16; G02B 21/00; G02B 21/02; G02B 21/025; G02B 21/248
USPC ....... 359/362, 368, 369, 372, 377, 379, 380, 359/382, 383, 384, 432
See application file for complete search history.

(56) References Cited

U.S. PATENT DOCUMENTS

| | | | |
|---|---|---|---|
| 5,737,134 A * | 4/1998 | Watanabe | G02B 21/248 359/381 |
| 2005/0094262 A1 * | 5/2005 | Spediacci | G02B 21/0012 359/380 |
| 2007/0019288 A1 * | 1/2007 | Karasawa | G02B 21/025 359/380 |
| 2011/0310474 A1 | 12/2011 | Wakamatsu et al. | |
| 2014/0253761 A1 | 9/2014 | Okada et al. | |
| 2014/0354796 A1 | 12/2014 | Hein | |

* cited by examiner

MICROSCOPE WITH OBJECTIVE-DEPENDENT LIMITATION OF THE ROTATION ANGLE OF THE ZOOM ROTARY WHEEL

CROSS REFERENCE TO RELATED APPLICATIONS

This application claims priority of German patent application number 10 2014 114 465.1 filed Oct. 6, 2014, the entire disclosure of which is incorporated by reference herein.

FIELD OF THE INVENTION

The invention relates to a microscope that encompasses an objective system that comprises at least two objectives selectably introducible into the beam path and having different focal lengths, and a receiving region for receiving the objective introduced into the beam path. The microscope furthermore encompasses a manually rotatable rotary wheel for adjusting the magnification of the zoom system, the rotary wheel being rotatable relative to a nonrotatable housing of the microscope within a predetermined maximum rotation range in a first direction and in a second direction opposite to the first direction, and the total zoom range being defined by the maximum rotation range.

BACKGROUND OF THE INVENTION

Magnification systems that comprise both an objective system and a zoom system are often used in digital microscopes, the zoom system imaging the image of the object to be examined microscopically directly onto an image sensing unit of the digital microscope system. The magnification is obtained as the quotient of the zoom system focal length that is set and the focal length of the objective present in the beam path. In order to achieve the highest possible magnification, a maximum focal length must be set for the zoom system, and an objective having a short focal length must be used. Conversely, for a low magnification a minimum focal length must be set via the zoom system, and an objective having the longest possible focal length must be used.

In known microscopes a maximum zoom factor, i.e. an adjustable magnification range that is as large as possible, is achieved by utilizing the zoom range to its respective limits, and correspondingly using objectives having very different focal lengths. The maximum and minimum magnifications are thus established by adapting the objectives to the zoom system.

In order to achieve the largest possible magnification range, both objectives having a very short focal length and objectives having a very long focal length must therefore be used. Objectives having very short focal lengths are disadvantageous, however, because the numerical apertures necessary for high magnifications require a complex objective design. Such objectives then usually permit only a very narrow field angle, since otherwise the optical corrections cannot be maintained. High-aperture compound objectives therefore generally do not allow for a downstream zoom system, and cause wider field angles to be cut off due to vignetting.

Conversely, the long objective focal lengths required for low magnifications require a correspondingly long distance between the objective interface and the object plane. When such objectives are introduced into the beam path it is therefore usually necessary to move the zoom system away from the object in order to achieve the required long distance to the object plane. A further disadvantage of objectives having long focal lengths is that the pupil diameter must be correspondingly large for a given object-side resolution; this results in high cost and requires objectives having large dimensions.

The use of objectives having greatly differing focal lengths furthermore has the disadvantage that the objectives also have very different parfocalizing distances, the parfocalizing distance being made up of the distance from the shoulder surface of the objective to the object plane, plus the physical length of the objective and the clear working distance. This makes parfocal implementation of the system very complex or in fact impossible.

SUMMARY AND ADVANTAGES OF THE INVENTION

The object of the invention is to describe a microscope that has a large magnification range and is nevertheless of simple and compact construction.

This object is achieved by a microscope having the features described herein. Advantageous refinements of the invention are discussed in this specification.

According to the present invention the rotary wheel encompasses a first engagement element. In addition, at least one second engagement element is arranged in movably mounted fashion on the housing of the microscope, this second engagement element in a deactivated position not being in engagement with the first engagement element, and in an activated position being in engagement with the first engagement element. When the two engagement elements are in engagement with each other, this engagement limits the rotatability of the handwheel to a partial rotation range, this partial rotation range being a partial range of the maximum rotation range of the handwheel. In particular, the result of engagement is that rotation of the rotary wheel in the first or the second direction is permitted only as far as a predetermined limit rotation angle, which is within the maximum rotation range and does not coincide with one of the limit rotation angles of the maximum rotation range. The position of the second engagement element is determined by the respective objective currently received in the receiving region, and thus by the objective present in the beam path.

What is achieved thereby is that provided the objective arranged in the beam path is embodied in such a way that in the context thereof, engagement between the first and the second engagement element exists, the rotatability of the rotary wheel is limited to the partial rotation range determined by the second engagement element. When this objective is introduced into the beam path the zoom system thus can be displaced not over the total zoom range, but instead only over a partial zoom range that lies within the total zoom range. The total zoom range within which the magnification can be adjusted is defined by the maximum rotation range, a correspondingly different magnification being set depending on the rotational position of the rotary wheel.

Is thus associated via the second limiting element in particular with a first objective and with a first partial zoom range within the total zoom range.

The result of using a zoom system that is dimensioned to be larger than would actually be necessary for the desired zoom factor is that the focal length differences among the objectives that are used do not have to be as great as with conventional microscopes. What can be achieved in particular by associating partial zoom ranges is that for objectives with high magnification a maximally high magnification is also accomplished by way of the zoom system, and the latter thus interacts for a high total magnification. For low-magnification objectives, conversely, the partial zoom range is selected within the total zoom range in such a way that it too corresponds to a lower magnification, so that wide field angles are achieved. What is achieved by way of the associated partial zoom range is thus that the zoom system is respectively adapted to the individual requirements of the respective objective, so that lesser demands can be placed on the construction of the objectives and, in particular, objectives having focal lengths closer to one another can be used. The result of this is that the objectives can be of more compact and therefore more economical construction.

In particular, objectives having more similar dimensions can thus be used, which in particular makes possible a parfocal objective system. The result of this parfocal embodiment of the objective system is in turn that refocusing does not need to occur upon an objective change. It also becomes possible to achieve a comparatively higher zoom factor. This yields the advantage that, in particular, a zoom factor that actually remains for the operator turns out to be the same for each objective.

The "total zoom range" of the zoom system is understood in particular as the maximum available zoom range dictated by the design. The total zoom range indicates, in particular, the different focal lengths that can be set by way of the zoom system. The limits of the total zoom range are thus defined by a minimum focal length and a maximum focal length of the zoom system.

The association of the partial zoom ranges with the respective objectives can be accomplished in particularly simple and reliable fashion thanks to the use of two engagement elements that form a mechanical engagement. Complex electrical control systems are, in particular, not needed for this, which simplifies the configuration and reduces fault susceptibility.

In a preferred embodiment of the invention the position of the second engagement element is established via contact with a contact surface of the objective respectively received in the receiving region. In particular, different objectives of the objective system can have differently shaped contact surfaces, with the result that depending on the objective and depending on the shape of the contact surface, the second engagement element is arranged in either the activated or the deactivated position, and thus correspondingly, as applicable, limits the adjustability of the zoom system for that objective to the partial rotation range defined by the second engagement element and thus to the corresponding partial zoom range pertinent to that partial rotation range. The second engagement element can in particular be biased into the activated or deactivated position and, via contact with the contact surface, either can be left in that position or can be moved into the respective other position. This movement occurs, in particular, upon introduction of the respective objective into the receiving region.

The objectives are, in particular, inserted into the receiving region. During insertion, an adjustment in the position of the second engagement element can occur as a result of contact between the second partial region and the objective contact surface provided therefor. If the second engagement element is to be left in the position into which it is biased, the contact surface is, in particular, embodied in such a way that it does not contact said second engagement element at all, or contacts it in such a way that while contact does take place it is nevertheless not sufficient to move the engagement element completely from the respective biased position into the respective other position.

In a particularly preferred embodiment of the invention a first and a second objective, which each comprise a contact surface, are provided. The contact surface of the first objective is embodied in such a way that when the first objective is received in the receiving region and is thus arranged in the beam path, the second engagement element is arranged in the activated position. Thus, for the first objective the rotation range of the rotary wheel is restricted by the second engagement element via engagement into the first engagement element, so that only the respectively associated partial zoom range can be used. Conversely, the contact surface of the second objective is embodied in such a way that when the second objective is received in the receiving region, the second engagement element is arranged in the deactivated position. Thus, with the second objective the second engagement element does not engage into the first engagement element, so that no restriction of the rotation angle of the rotary wheel occurs at least as a result of that engagement element.

In a particularly preferred embodiment of the invention the second engagement element is biased with the aid of an elastic element into the activated position, and is moved from the activated into the deactivated position against the return force of the elastic element by those objectives for which it is to be arranged in the deactivated position, via contact with the correspondingly embodied contact surface of those objectives, upon introduction of those objectives.

When the objective is again removed from the receiving region, the elastic element then moves the second engagement element back into the activated position.

Biasing into the activated position has the advantage that when no objective is introduced into the receiving region, an engagement always exists between the first and the second engagement element, and the rotatability of the rotary wheel is thus restricted.

In an alternative embodiment of the invention the second engagement element can be biased via an elastic element into the deactivated position as well, and can be moved, if desired, into the activated position via the objectives depending on the configuration of the contact surfaces.

In a further alternative embodiment of the invention biasing can also occur into neither of the two positions, but instead the second engagement element can be actively moved into both positions by the respective objectives.

It is furthermore alternatively possible for the "biasing" also to be accomplished not by way of an elastic element but instead by gravity. This is possible in particular if the second engagement element is moved vertically for displacement between the two positions; in this case the second engagement element is arranged in the lower position if an objective having a corresponding contact surface is not arranged in the receiving region, and upon introduction of the objective it can be raised by contact with the contact surface of the objective.

The elastic element is, in particular, a spring, preferably a compression spring. A particularly simple and nevertheless reliable configuration is thereby achieved.

In a particularly preferred embodiment of the invention the contact surface of the first objective is configured in such a way that when the first objective is introduced into the receiving region, the second engagement element is not contacted by the contact surface of the first objective. What is achieved thereby is that the second engagement element remains in the position into which it is biased, i.e. in particular in the activated position. In addition, the contact surface of the second objective is, in particular, embodied in such a way that when the second objective is introduced into the receiving region, the second engagement element contacts the contact surface of the second objective and, via that contact, is moved against the return force of the elastic element from the biased position into the non-biased position, i.e. in particular from the activated position into the deactivated position.

The contact surfaces of the first and of the second objective are, in particular, embodied in step-shaped fashion, said steps having beveled side walls so that the second engagement element can slide on said steps upon insertion of the objectives and can correspondingly be moved as desired between the activated and the deactivated position. Jamming, in particular, is thereby avoided. In addition, reliable, purely mechanical displacement of the second engagement element is thereby ensured.

In a particularly preferred embodiment of the invention the first engagement element encompasses at least one gate and the second engagement element encompasses a pin, such that in the activated position the pin engages into the gate. This engagement can therefore be rotated only until the pin comes to a stop against a side of the gate at its end region, so that the rotation range is restricted at least in that direction by the engagement. In particular, a restriction of the rotation range in two directions can also thereby be accomplished by way of the two ends of the gate. What is then achieved thereby is that for a corresponding objective, the partial rotation range is located within the maximum rotation range in such a way that none of its limits coincides with the limits of the maximum rotation range. If, conversely, the pin restricts the rotation range by engagement into the gate in only one direction, for example because in the other direction the rotary wheel first abuts against a limit stop for limiting the maximum rotation range before the pin would abut against the other end of the gate, then at least that one limit of the partial rotation range coincides with the limit of the maximum rotation range.

It is furthermore advantageous if the second engagement element encompasses a connecting element that is fixedly connected to the pin and that, depending on the embodiment of the contact surface of the objective, is contacted by the latter and is moved by that contact. By way of the corresponding movement of the connecting element, the pin fixedly connected to the connecting element is correspondingly also moved. The result thereby achieved is that the pin can be received in securely guided fashion in the housing, and that contact with the contact surface of the introduced objective can nevertheless be established via the connecting element, which in particular is likewise embodied as a pin. The connecting element, in particular, protrudes for that purpose into the receiving region.

In a particularly preferred embodiment of the invention several second engagement elements are provided, which respectively in a deactivated position are not in engagement with the first engagement element, and in an activated position are in engagement with the first engagement element. The rotatability of the rotary wheel is respectively limited to a partial range thanks to this engagement in the activated position, this partial rotation range being respectively a partial range of the maximum rotation range and thus corresponding respectively to the partial zoom range within the total zoom range. The respective objective currently arranged in the receiving region determines which of these several second engagement elements are arranged in the activated position, and which in the deactivated position. Even with a plurality of objectives, the optimum partial zoom range for each of the objectives can thus be established for each such objective by limiting the rotatability of the rotary wheel to the partial rotation range corresponding to that partial zoom range.

The first engagement element encompasses, in particular, two gates. In addition, four pins in particular are provided as second engagement elements, two of which pins engage into the first of the gates and the other two of which engage into the second of the two gates, in each case if they are arranged in the activated position.

In a particularly advantageous embodiment of the invention several objectives are provided, each objective defining, if it is received in the receiving region, a different combination of the arrangement of the pins in the activated or deactivated position. A different rotation range and thus a different partial zoom range are thus established for each objective.

In a particularly preferred embodiment of the invention three objectives are provided, such that when a first objective is received in the receiving region, the first pin is arranged in the activated position and the other three pins are arranged in the deactivated position. Thus for the first objective the partial rotation range associated therewith is determined on the one hand by engagement of the pin into the corresponding gate, and on the other hand, in the other direction, by way of the limit of the maximum rotation range.

When the second objective is arranged in the receiving region, however, the second and the third pin are arranged in the activated position and the first and the fourth pin are arranged in the deactivated position. The partial rotation range associated with the second objective is then correspondingly limited in both directions by the two pins, so that the corresponding partial zoom range is located within the total zoom range without sharing a limit with the total zoom range.

When the third objective is received in the receiving region, however, only the fourth pin is arranged in the activated position. The other three pins are arranged in accordance with the deactivated position. Thus in the case of the third objective the corresponding partial rotation range is defined by engagement of the fourth pin into the corresponding gate and by the limitation of the maximum rotation range.

It is furthermore advantageous if a first and a second stationary limit stop are provided in order to limit the maximum rotation range. These two limit stops are, in particular, arranged in stationary fashion relative to the housing of the microscope and cannot be moved between different positions, so that these limit stops always limit the rotatability of the rotary wheel.

It is furthermore advantageous if the second engagement or second engagement elements are linearly displaceable between the activated and the deactivated position. This ensures particularly simple, low-error movement of the second engagement element or elements between the activated and the deactivated position.

The features described previously for the second engagement element can also correspondingly be implemented for several second engagement elements when they are used. In particular, all the second engagement elements can respectively be biased via an elastic element into the activated position.

If the rotary wheel is set outside the partial rotation range defined for an objective before that objective is introduced into the receiving region, the second engagement element then snaps into the first engagement element upon initial rotation into the predetermined partial rotation range, so that at least thereafter the rotatability is restricted to the corresponding partial rotation range. The second engagement element is for that purpose, in particular, guided on a surface into which the first engagement element is introduced, so that upon reaching the first engagement element it is automatically pushed thereinto by the elastic element.

The gate or gates of the first engagement element are, in particular, of circular-segment-shaped configuration.

Preferably a second partial zoom range within the total zoom range is also associated with the second objective.

In a preferred embodiment the partial zoom range of at least one objective is smaller than the total zoom range. It is particularly advantageous if the partial zoom ranges of all the objectives are respectively smaller than the total zoom range of the zoom system. Thus for each objective, only that partial range of the total zoom range which matches the properties of the objective in terms of its properties is respectively used for each objective.

Because the total zoom range of the objective is thus larger than the partial zoom ranges that are used for the individual objectives, the zoom system is also referred to as an "overdimensioned" or "oversized" zoom system.

The partial zoom ranges of the objectives can also at least partly overlap. Alternatively, it is also possible for the partial zoom ranges to be selected in such a way that no overlaps occur. The result of overlapping of the partial zoom ranges is that each objective has the largest possible adjustment range resulting from the corresponding setting of the focal length of the zoom system, and the magnification can be correspondingly widely varied.

In a preferred embodiment of the invention the lower and upper limits of the partial zoom ranges are each selected in such a way that the same predetermined zoom factor is obtained for the various partial zoom ranges between the respective upper and lower limit. The "zoom factor" is understood in particular as the quotient of the lower and the upper limit, i.e. in particular the quotient of the maximum focal length and the minimum focal length, for the respective partial zoom range. The result thereby achieved is that the same zoom factor is available to the operator for each objective, so that the operator has the same magnification capability regardless of which objective is used; different total magnifications are of course nevertheless obtained depending on the objective used, since this is obtained as the quotient of the zoom system focal length divided by the objective focal length.

It is advantageous in particular if the lower limit of at least one partial zoom range corresponds to the lower limit of the total zoom range, and if the upper limit of at least one partial zoom range corresponds to the upper limit of the total zoom range. What is achieved thereby is that the total zoom range of the zoom system is optimally utilized, and the total resulting zoom factor of the microscope is thus also as large as possible.

It is particularly advantageous if the partial zoom ranges are preset in such a way that the partial zoom range of an objective having a focal length that is longer than the focal length of another objective encompasses magnifications or focal lengths that are less than the least magnification or focal length of the partial zoom range of that other objective. If the one objective has a "longer focal length" than the other objective, this means that that objective produces a lower magnification than the other objective. The partial zoom range is thus selected in such a way that, with reference to the total zoom range, it covers the shorter focal lengths of the partial zoom range, so that the properties of the objective and of the zoom system, in particular the desired wide field angle at low magnifications, optimally complement one another.

Conversely, the partial zoom ranges are preset in such a way that the partial zoom range of an objective having a focal length that is shorter than the focal length of another objective encompasses magnifications or focal lengths that are greater than the greatest magnification or focal length of the partial zoom range of another objective. The result achieved thereby is that for high-magnification objectives the partial zoom range also covers the long focal lengths of the total zoom range, and thus contributes to a high total magnification.

In a particularly preferred embodiment of the invention the objective system has a first objective having a first focal length and a second objective having a second focal length, the second focal length being longer than the first focal length. The second objective thus produces a lower magnification than the first objective. The total zoom range has a third focal length as a lower limit and a fourth focal length as an upper limit. The first partial zoom range associated with the first objective has the fourth focal length as an upper limit, and the second partial zoom range associated with the second objective has the third focal length as a lower limit. The result thereof is that the first objective, which has the higher magnification of the two objectives, achieves a maximally high total magnification when the fourth focal length is set together with the zoom system. Conversely, a maximally low magnification can be achieved by selecting the second objective and the third focal length.

The focal lengths can also, in particular, be selected in such a way that with corresponding settings, the total magnifications that result are <1, i.e. the objects are imaged at reduced size.

It is furthermore advantageous if limiting means are provided with which the adjustability of the zoom system is limited respectively to the partial zoom range that is associated with the selected objective, i.e. to that objective which is currently introduced into the beam path.

In a particularly preferred embodiment of the invention at least one limit stop is provided on each objective as a limiting means, the adjustability of the zoom system being limited by the limit stop to the partial zoom range respectively associated with that objective. This ensures, in particular purely mechanically, that for each objective, adjustment of the zoom system is possible only within the associated partial zoom range.

In a particularly preferred embodiment two limit stops, with which the adjustment of the zoom system is limited, are provided on each objective. If a limit of the partial zoom range is defined by a limit of the maximum possible total zoom range dictated by the design, a limit stop can be omitted at that end.

In a particularly preferred embodiment of the invention the adjustment of the zoom system can also be accomplished electrically by the fact that an electrical drive unit, in particular a motor, is provided. A control unit for applying control to the drive unit is also provided, the partial ranges associated with the respective objectives being stored in said control unit. The control unit then applies control to the drive unit in such a way that an adjustment only within the respective partial zoom range is possible in each case. In particular, a sensor apparatus, with which the control unit can automatically detect which objective is introduced into the beam path, is provided, so that the control unit then automatically selects the partial zoom range settable by the operator and correspondingly applies control to the electrical drive unit. In this case it is possible in particular to omit mechanical limit stops for limiting the partial zoom range, since the control applied by the electrical drive unit serves as a limiting means.

It is further advantageous if the microscope encompasses an actuation element for manually adjusting the magnification factor of the zoom system. This actuation element can be a rotary knob.

It is further advantageous if the microscope encompasses a diaphragm for adjusting the light transmission as a function of the respectively selected objective and of the respectively set focal length of the zoom system. This diaphragm is in particular a controlled iris diaphragm that regulates the aperture as a function of the objective and of the zoom system focal length that is set. This is necessary in particular because pupil diameters are generally smaller in the case of high-magnification objectives. With high-magnification objectives the magnification typically rises more steeply than the aperture, since otherwise the aperture ratio of the objective becomes too high, which would make correction of aberrations very difficult. In an alternative embodiment, a diaphragm of this kind can be omitted if objectives having very high apertures are correspondingly used.

It is further advantageous if the zoom system comprises at least two lens groups, one of which is movable in the direction of the optical axis in order to adjust the focal length of the zoom system. In a preferred embodiment the zoom system comprises three or four lens groups, two of which are movable in the direction of the optical axis.

The microscope is, in particular, a digital microscope that encompasses an image sensing unit for acquiring images of the object to be examined microscopically. With the digital microscope, the image of the object to be examined microscopically is, in particular, imaged via the zoom system directly onto the image sensing unit.

In an alternative embodiment the microscopes in question can also be visual.

BRIEF DESCRIPTION OF THE DRAWING VIEWS

Further features and advantages of the invention are evident from the description that follows, which explains the invention in further detail with reference to exemplifying embodiments in conjunction with the appended Figures, in which:

FIG. 1 is a schematic perspective depiction of a digital microscope;

FIG. 2 schematically depicts a magnification system of the microscope according to FIG. 1;

FIG. 3 schematically depicts a magnification system according to FIG. 2 when a first objective is used;

FIG. 4 schematically depicts a magnification system according to FIG. 2 when a second objective is used;

FIG. 5 schematically depicts a total zoom range and the partial zoom ranges of the first and the second objective;

Figure 8:
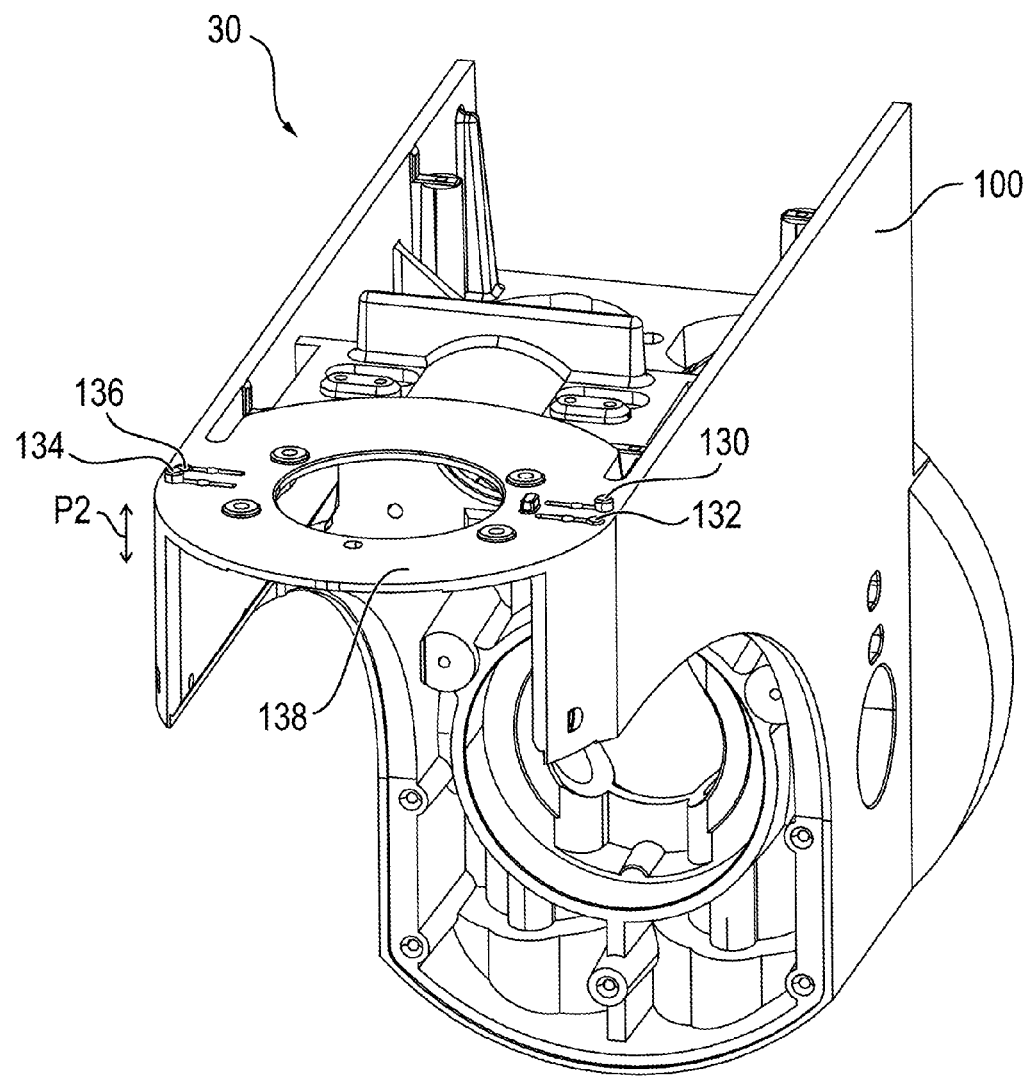
Figure 9:
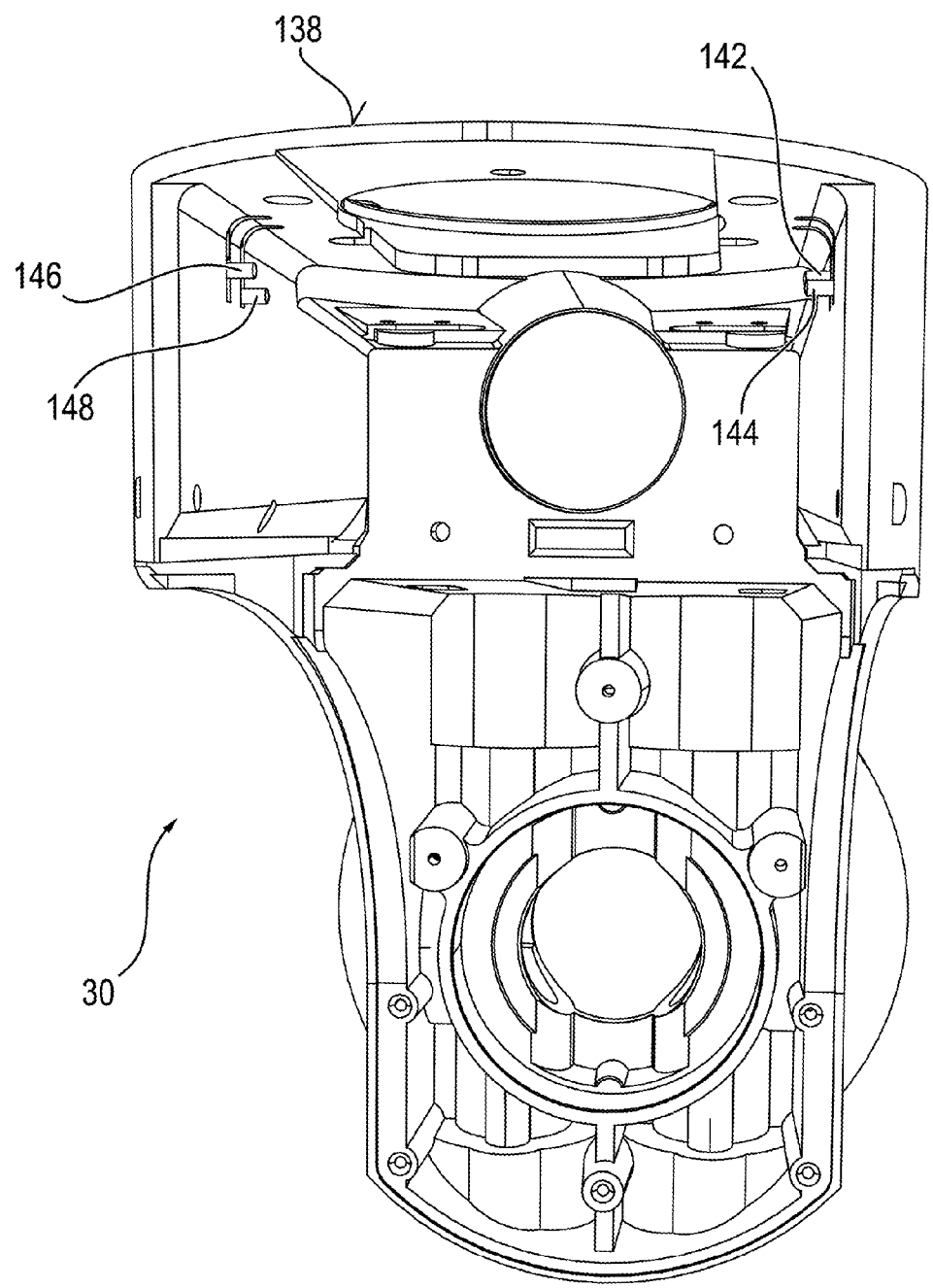
Figure 10:
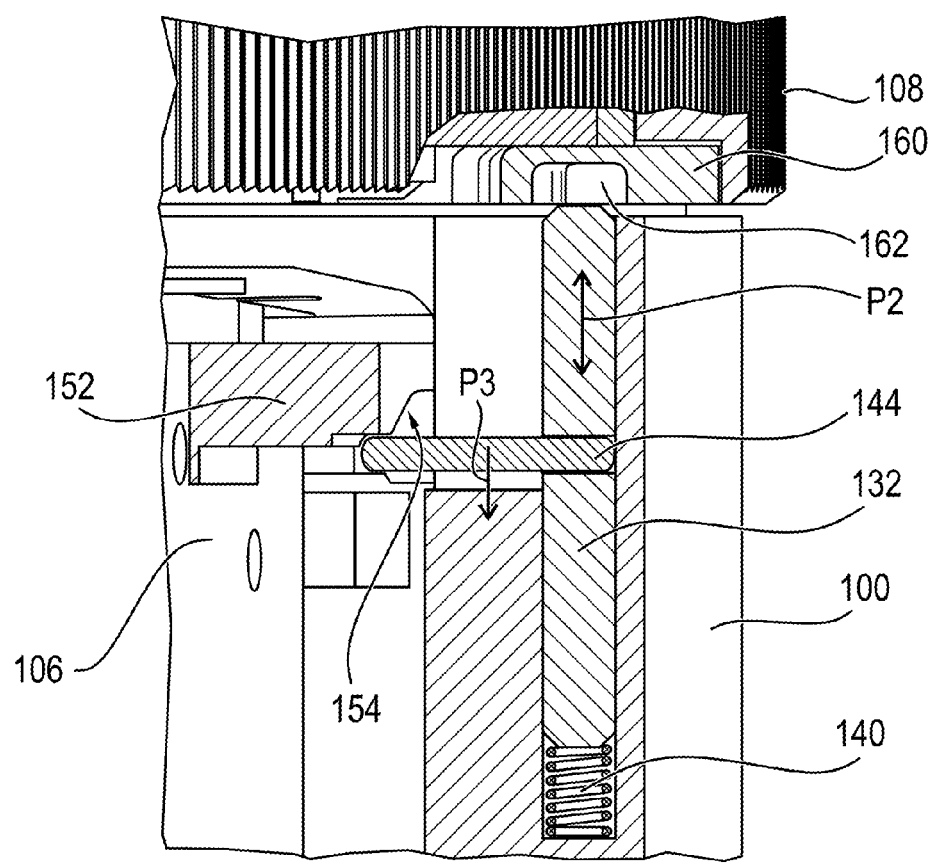
Figure 11:
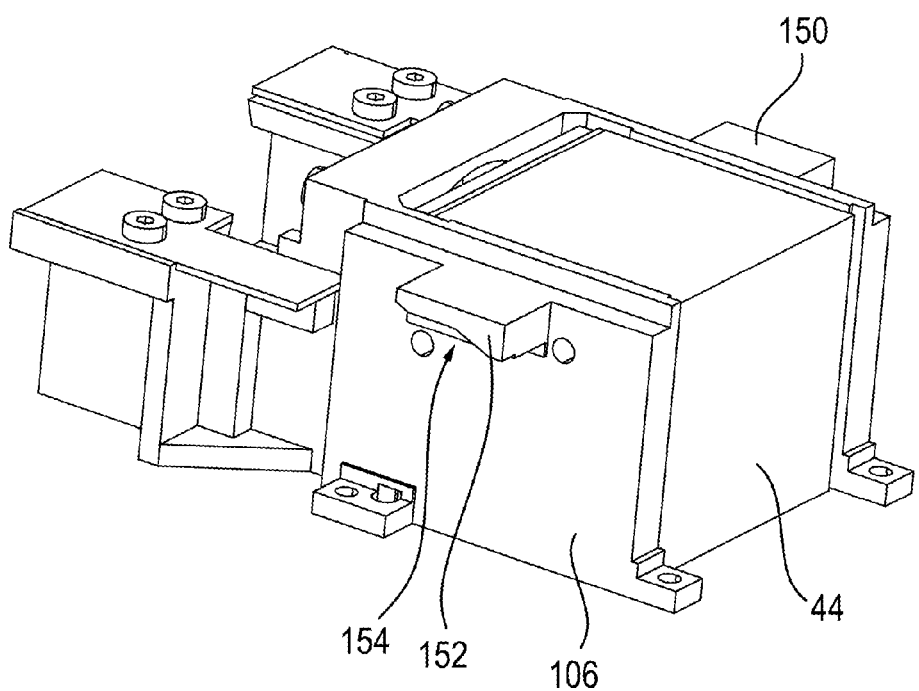
Figure 12:
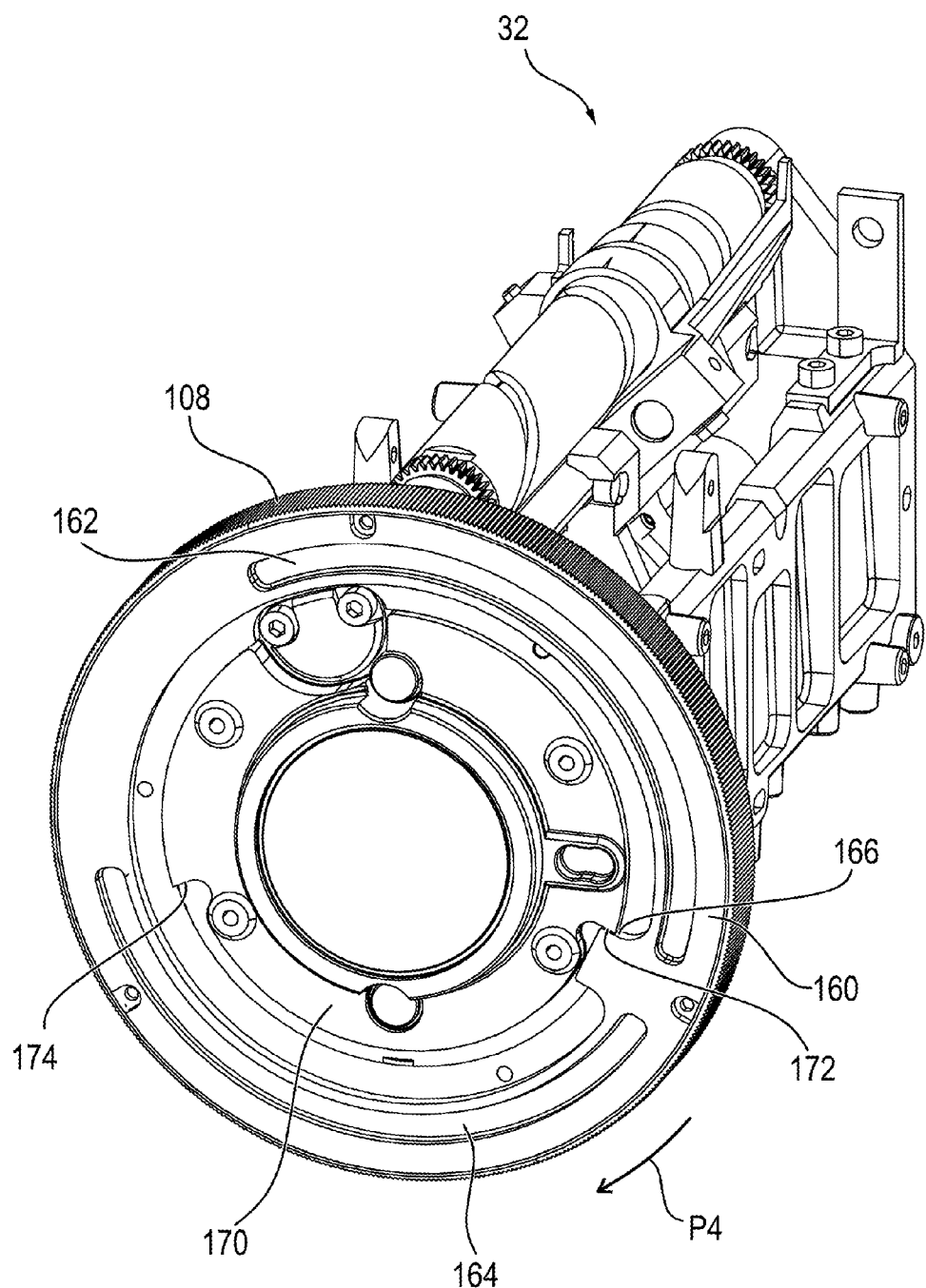
Figure 13:
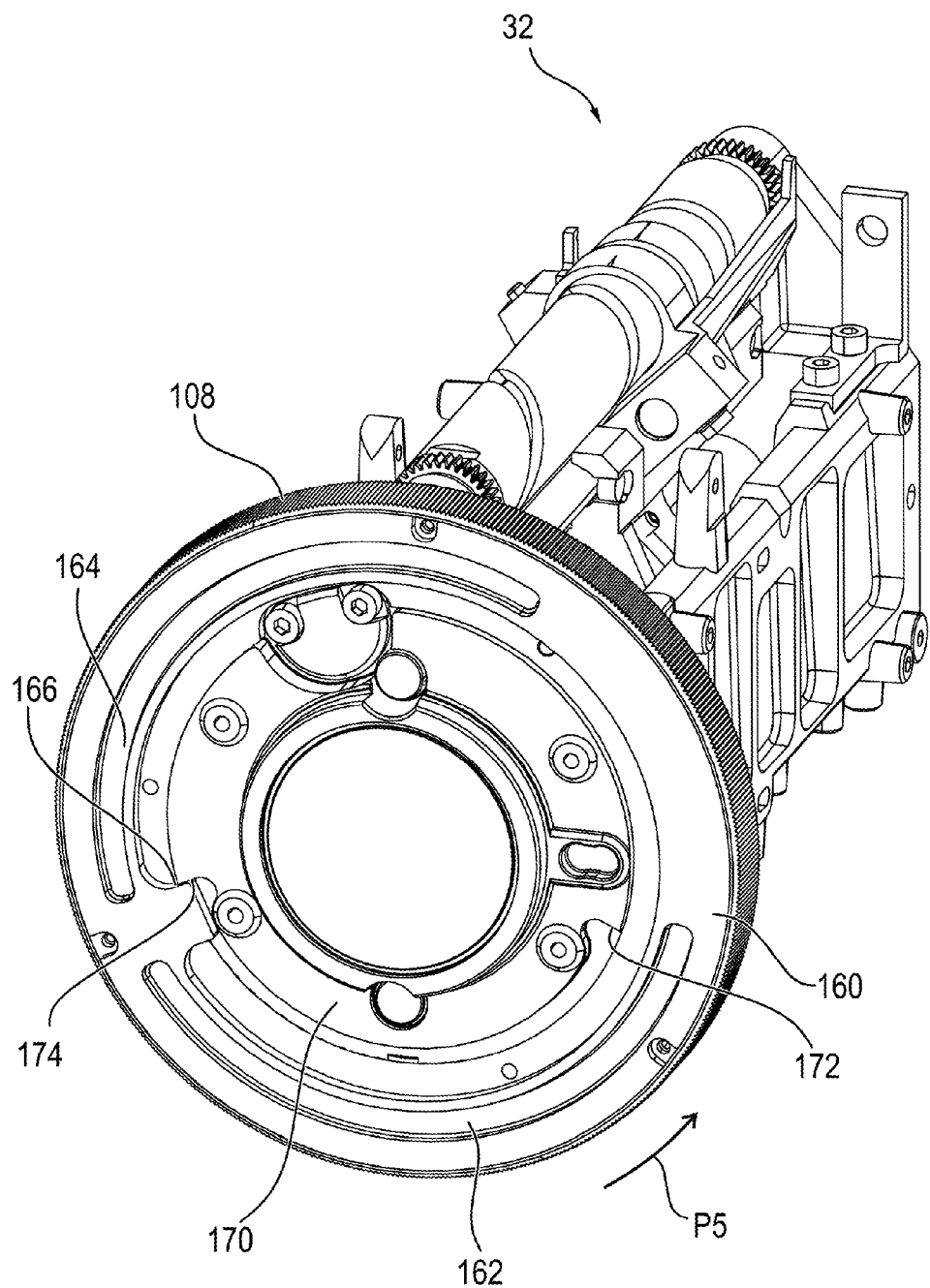
Figure 14:
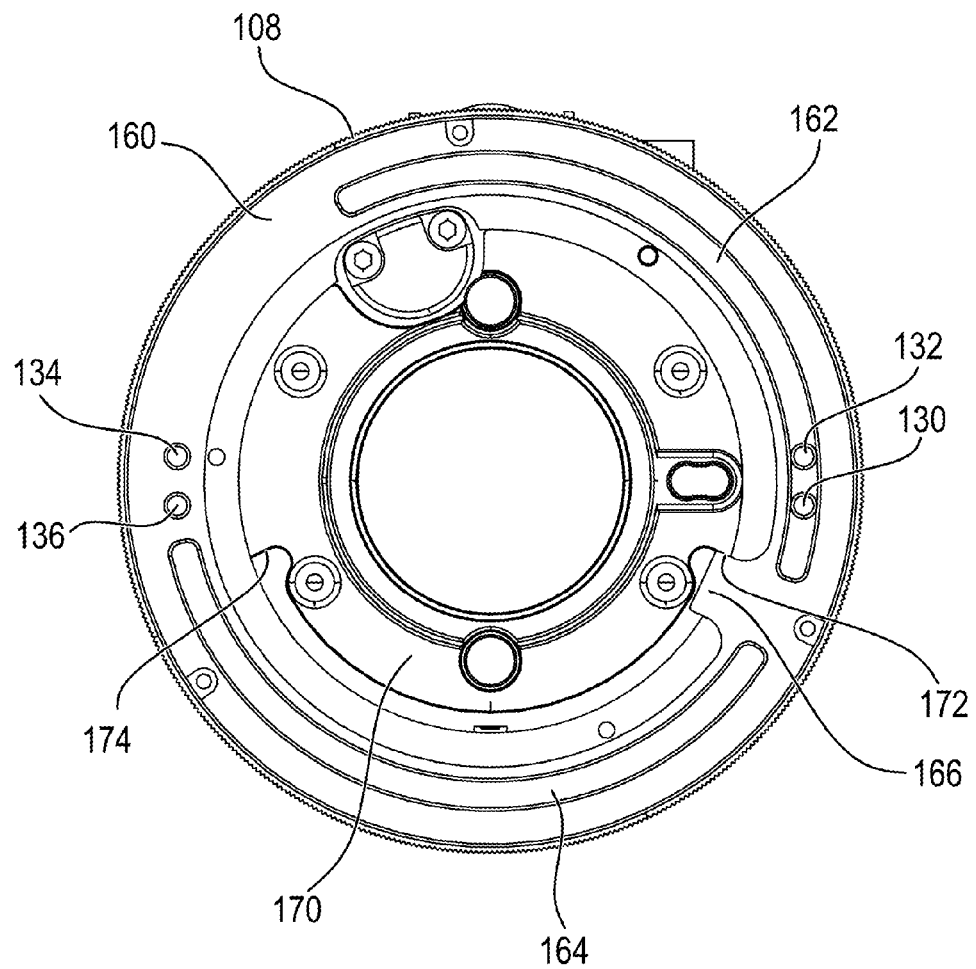
Figure 15:
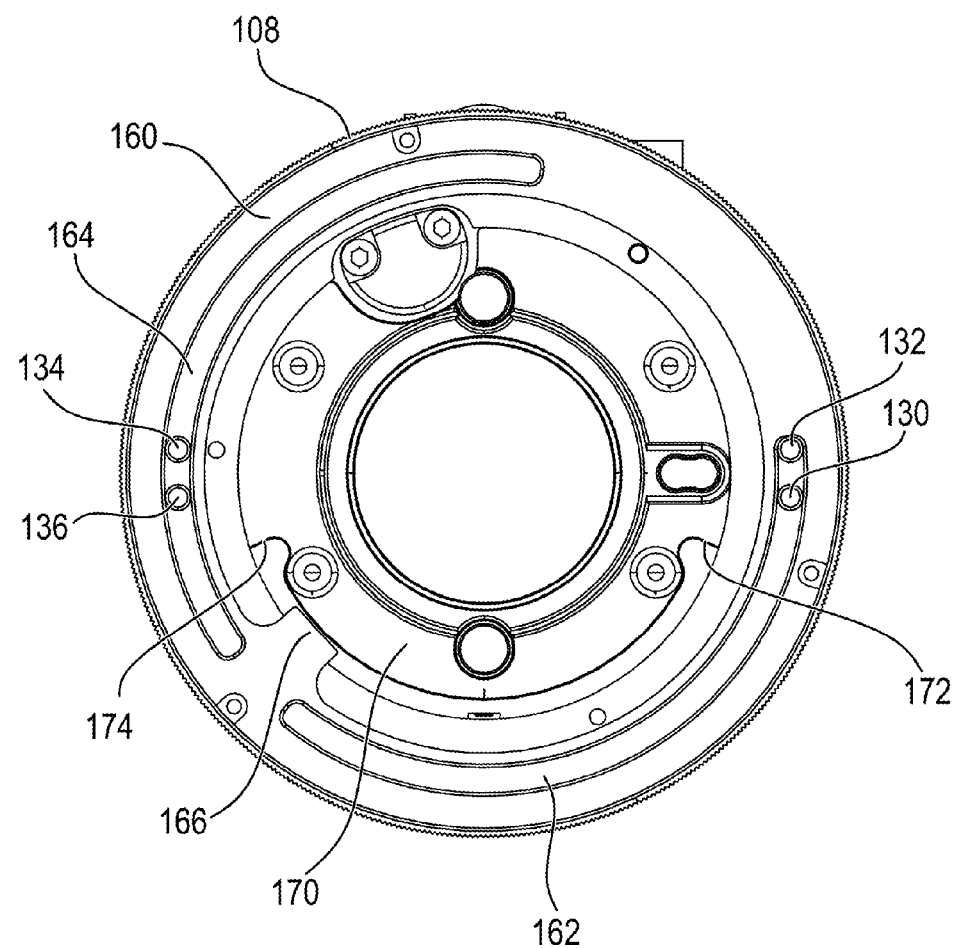
Figure 16:
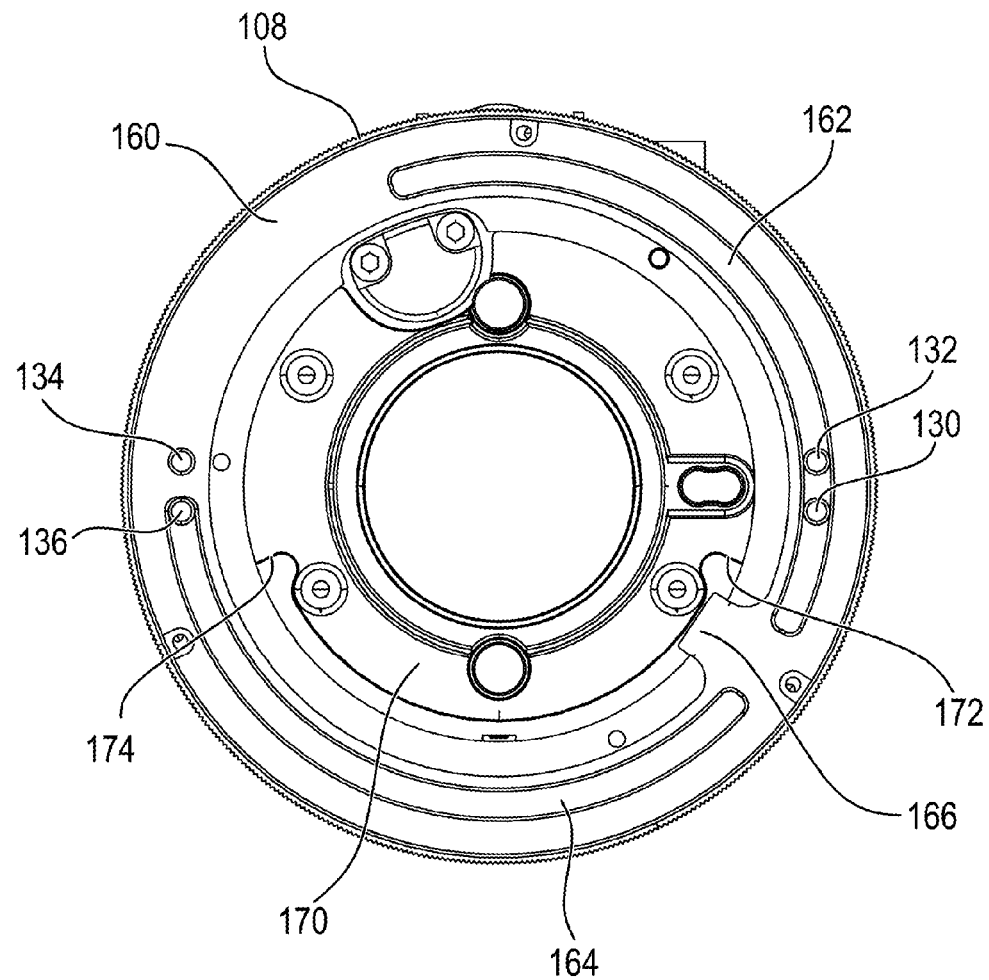
Figure 17:
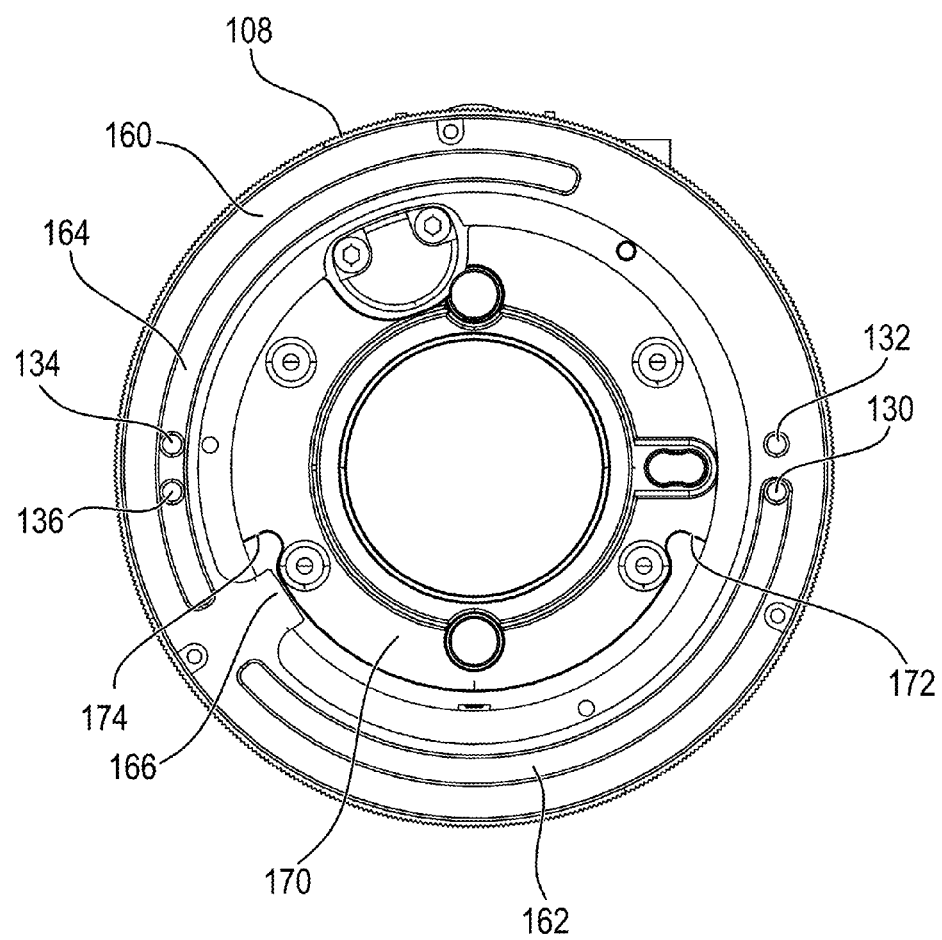
Figure 18:
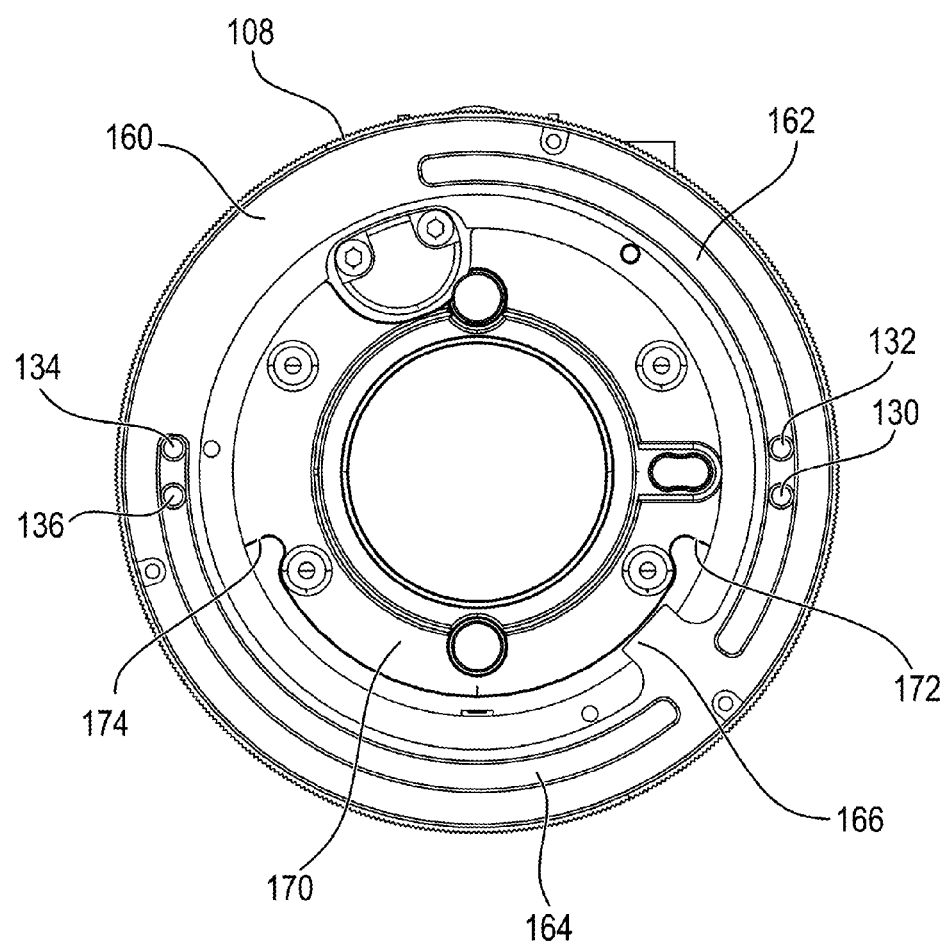
Figure 19:
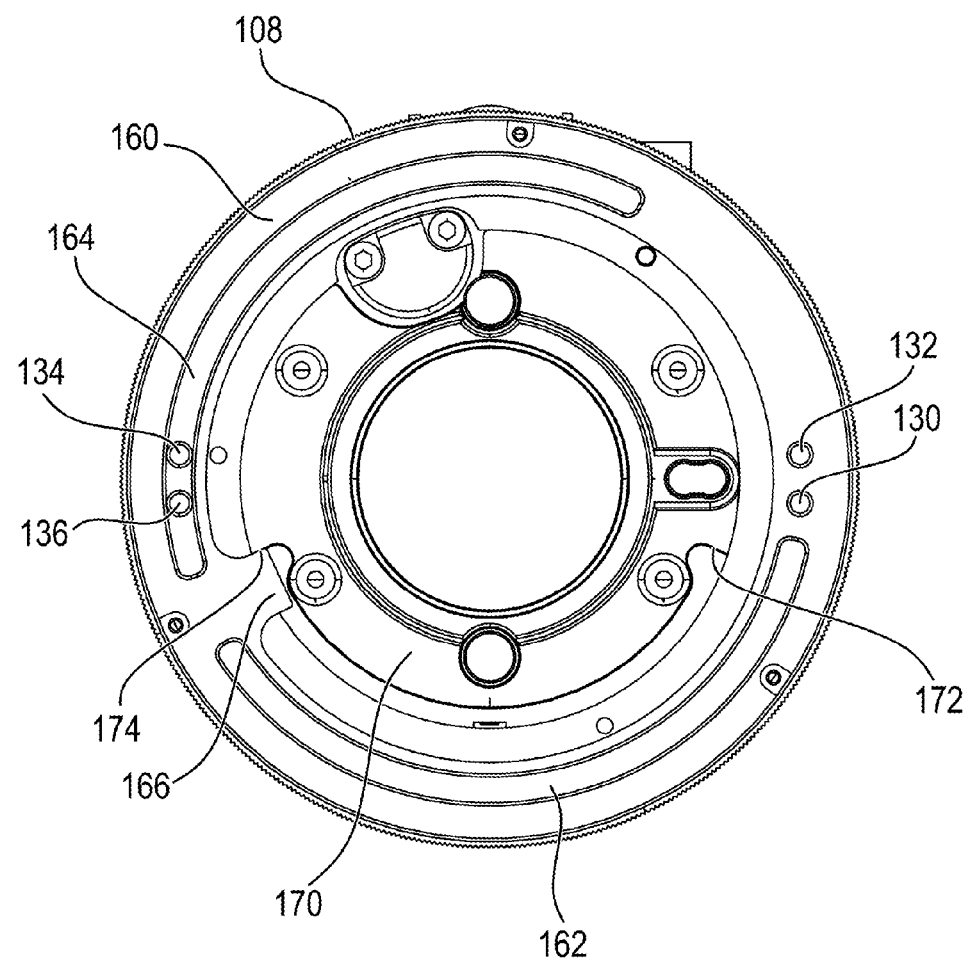

FIG. 8 schematically depicts a housing of the microscope;

FIG. 9 is a further schematic perspective depiction of the housing according to FIG. 8;

FIG. 10 schematically depicts a detail of the microscope;

FIG. 11 schematically depicts a portion of an objective and of an objective housing;

FIG. 12 is a schematic perspective depiction of the actuation element of the zoom system in a first rotational position;

FIG. 13 is a schematic perspective depiction of the actuation element according to FIG. 12 in a second rotational position;

FIG. 14 schematically depicts the actuation element when a first objective is in use, in a first operating state;

FIG. 15 schematically depicts the actuation element when a first objective is in use, in a second operating state;

FIG. 16 schematically depicts the actuation element when a second objective is in use, in a third operating state;

FIG. 17 schematically depicts the actuation element when a second objective is in use, in a fourth operating state;

FIG. 18 schematically depicts the actuation element when a third objective is in use, in a fifth operating state; and FIG. 19 schematically depicts the actuation element when a third objective is in use, in a sixth operating state.

DETAILED DESCRIPTION OF THE INVENTION

Figure 1:
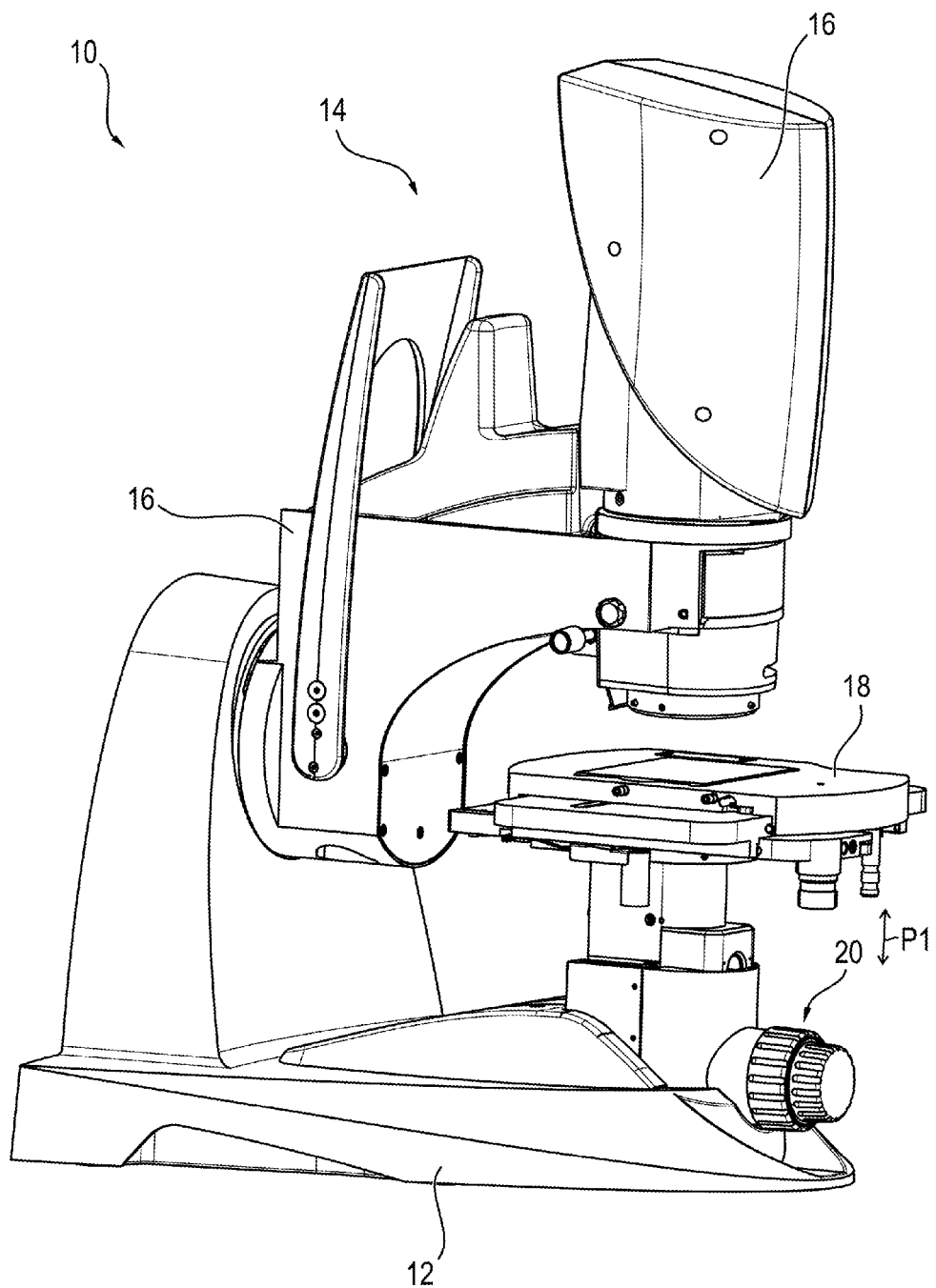

FIG. 1 is a schematic perspective depiction of a digital microscope. Microscope 10 encompasses a stationary stand body 12 as well as a pivot unit 14 pivotable relative thereto.

Pivot unit 14 encompasses at least an image sensing unit with which an image of the objects to be examined microscopically can be acquired. In particular, using this image sensing unit it is possible to acquire not only individual images but also videos, which allow observation from different viewing angles of the object to be examined microscopically.

The pivot unit furthermore comprises an objective system and a zoom system, with which different magnifications of the objects to be examined microscopically can be set. The objective system has a plurality of objectives, one of which can respectively be swung selectably into the beam path.

The image sensing unit, the objective system, and the zoom system are not visible in FIG. 1 because they are concealed by a housing 16 of pivot unit 14.

The configuration of the objective system and of the zoom system will be described in further detail below with reference to FIGS. 2 to 4.

The objectives of the objective system are, in particular, embodied to be parfocal, so that an objective change does not necessitate refocusing by the operator. The objectives are, in particular, coordinated with the distance between the rotation axis around which pivot unit 14 can be rotated and the interface of the objectives; this yields a eucentric system, the consequence being that refocusing need not occur upon pivoting of pivot unit 14.

Also arranged on the stand body is a stage 18 on which the objects to be examined microscopically are placed. This stage 18 can be displaced relative to stand base 12 in the direction of double arrow P1 with the aid of adjusting wheels 20, thereby enabling focusing of the objects to be examined microscopically.

Figure 2:
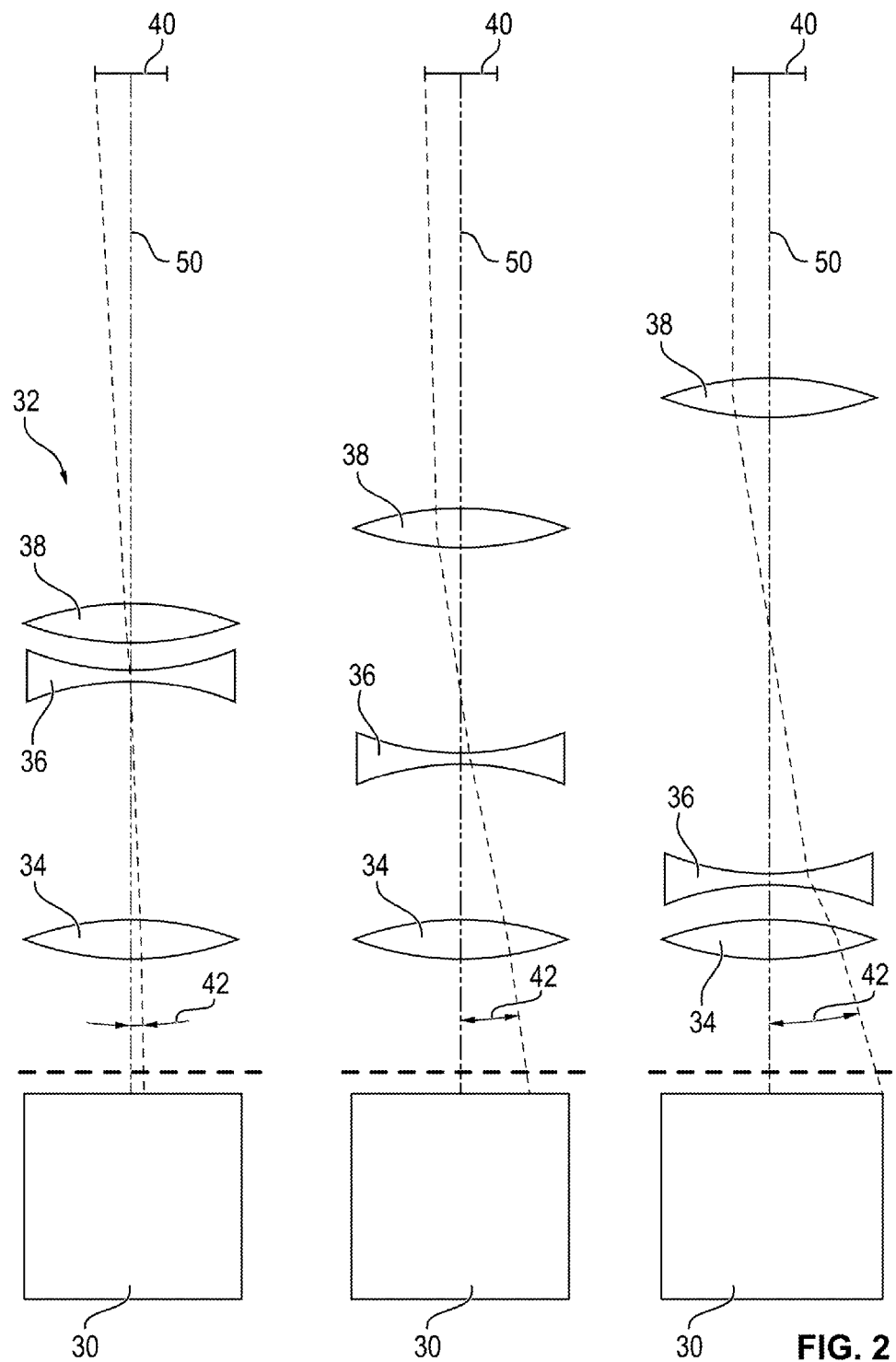

The magnification system arranged in pivot unit 14 is shown in FIG. 2, purely schematically, in three different settings. The magnification system encompasses an objective system 30 as well as a zoom system 32, a desired total magnification being achieved by the interaction thereof. Objective system 30 encompasses at least two objectives 44, 52 having different focal lengths, one of which is respectively pivoted selectably into the beam path of microscope 10.

Zoom system 32 comprises three lens groups 34 to 38, of which two lens groups 36, 38 are adjustable in the direction of optical axis 50. In an alternative embodiment of the invention the zoom system can also encompass only two lens groups 34 to 38, of which only one lens group 34 to 38 is axially adjustable. Zoom systems having more than three lens groups 34 to 38 are also conceivable.

In the embodiment shown in FIG. 2, the image of the object is imaged via zoom system 32 directly onto an image sensing unit 40, which in particular can be a camera.

Three settings of zoom system 32 are shown in FIG. 2. In the left setting, zoom system 32 is set so that it has a maximum focal length and thus produces a maximum magnification. Field angle 42, which indicates the angle of the main beam with respect to optical axis 50 in the region of the interface with optical system 30, is correspondingly minimal.

The setting shown on the right in FIG. 2, conversely, shows the other extreme setting of zoom system 32, namely the setting in which zoom system 32 has a minimum focal length and correspondingly a minimum magnification effect. In this case field angle 42 is maximal.

The instance shown at the center in FIG. 2 represents an intermediate position in which the focal length achieved by zoom system 32 is one that is longer than the minimum focal length and shorter than the maximum focal length. Field angle 42 is correspondingly between field angles 42 of the other two instances.

The respective total magnification of microscope 10 is obtained as the quotient of the focal length of zoom system 32 which is set, and the focal length of that objective 44, 52 of objective system 30 which is introduced into the beam path.

Figure 5:
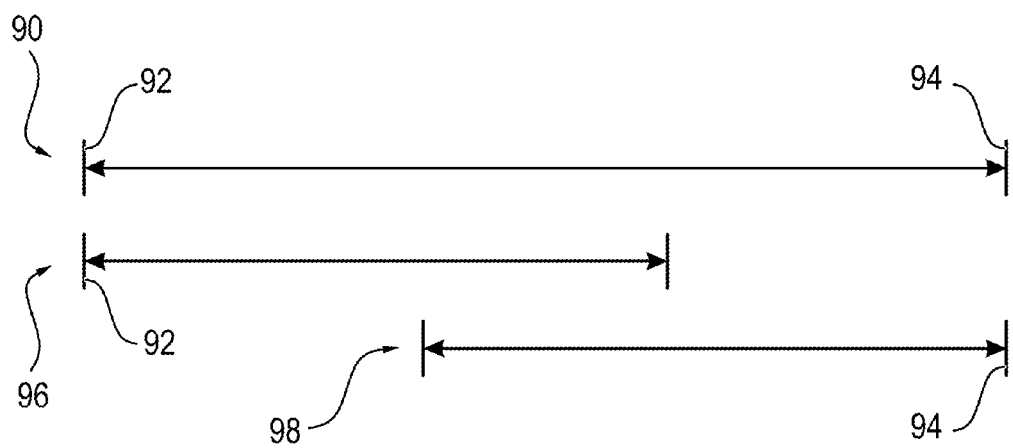

Zoom system 32 has a total zoom range that indicates the focal lengths of zoom system 32 which can be set via zoom system 32. This total zoom range is depicted in FIG. 5 by way of example by arrow 90, lower limit 92 indicating the minimum focal length of zoom system 32 which is produced at the setting shown on the right in FIG. 2. Upper limit 94 of total zoom range 90 correspondingly indicates the maximum focal length of zoom system 32 which is produced at the setting shown on the left in FIG. 2. Total zoom range 90 is thus in particular predefined by the physical design, and indicates the maximum possible range of magnifications of zoom system 32.

As already described, objective system 32 encompasses several objectives 44, 52 having different focal lengths. Each of these objective 44, 52 has associated with it a partial zoom range within total zoom range 90; FIG. 5 depicts a first partial zoom range 96 for a first objective 44 and a second partial zoom range 98 of a second objective 52. The two partial zoom ranges 96, 98 each cover only part of total zoom range 90, and in particular are embodied in such a way that they at least partly overlap.

Microscope 10 is embodied in such a way that zoom system 32 is always adjustable only within the respective partial zoom range 96, 98 that is associated with objective 44, 52 that is currently pivoted into the beam path.

In the exemplifying embodiment depicted in FIG. 5, first objective 44 with which partial zoom range 96 is associated has, compared with second objective 52, a longer focal length and thus less of a magnifying effect. First partial zoom range 96 is correspondingly also selected in such a way that, as compared with partial zoom range 98, it cover the lower magnifications of the total zoom range 90, whereas the second partial zoom range 98 encompasses the higher magnifications of the total zoom range 90.

What is achieved thereby is that with objectives 52 having a high magnification, i.e. a short focal length, high magnifications are also achieved with the zoom system, so that in total a high total magnification is attained.

Conversely, with objectives 44 having a low magnification, i.e. having a wide field angle, what is associated is a partial zoom range 96 in which zoom system 32 likewise has a low magnification and thus a wide field angle.

The partial range of zoom system 32 which is used is thus always coordinated with the properties of the respective objective 44, 52.

Figure 3:
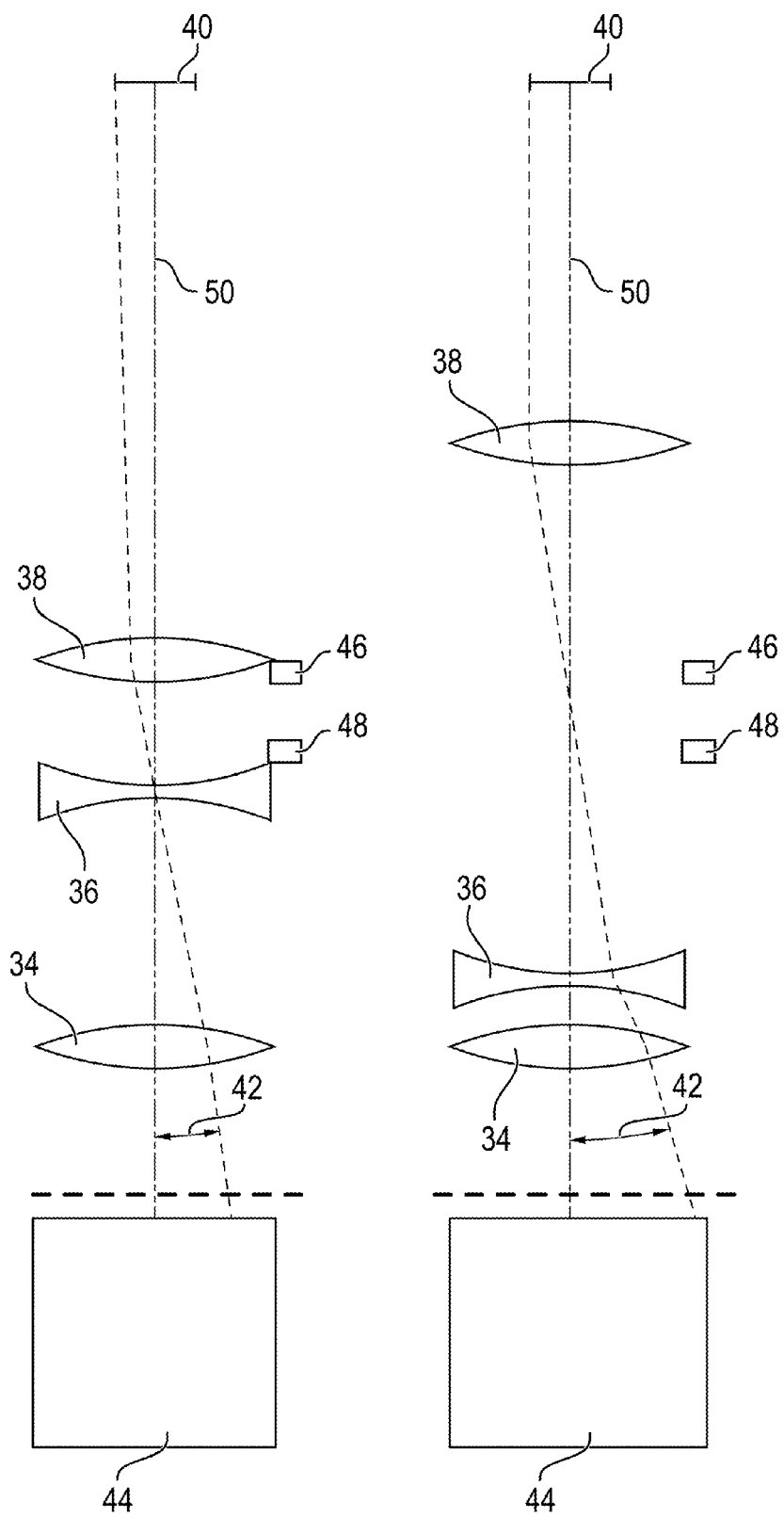

FIG. 3 schematically depicts the magnification system according to FIG. 2 in two states, first objective 44 of objective system 30 being introduced into the beam path. With first objective 44, which has a comparatively long focal length, i.e. low magnification, the adjustability of zoom system 32 is limited by limiting elements 46, 48 in such a way that, compared with the maximum adjustment range shown in FIG. 2, adjustment is possible down to the minimum focal length (FIG. 3, right) but not to the maximum focal length. Correspondingly, an adjustment of zoom system 32 is possible only within first partial zoom range 96. The movement of lens groups 36, 38 toward one another is limited by limiting elements 46, 48 to the state shown on the left in FIG. 3. Limiting elements 46, 48 are, in particular, limit stops that are coupled to first objective 44 so that upon introduction of first objective 44 into the beam path, limit stops 46, 48 are automatically moved as well so that they are arranged in such a way that they are arranged in the movement region of lens groups 34 to 38.

Figure 4:
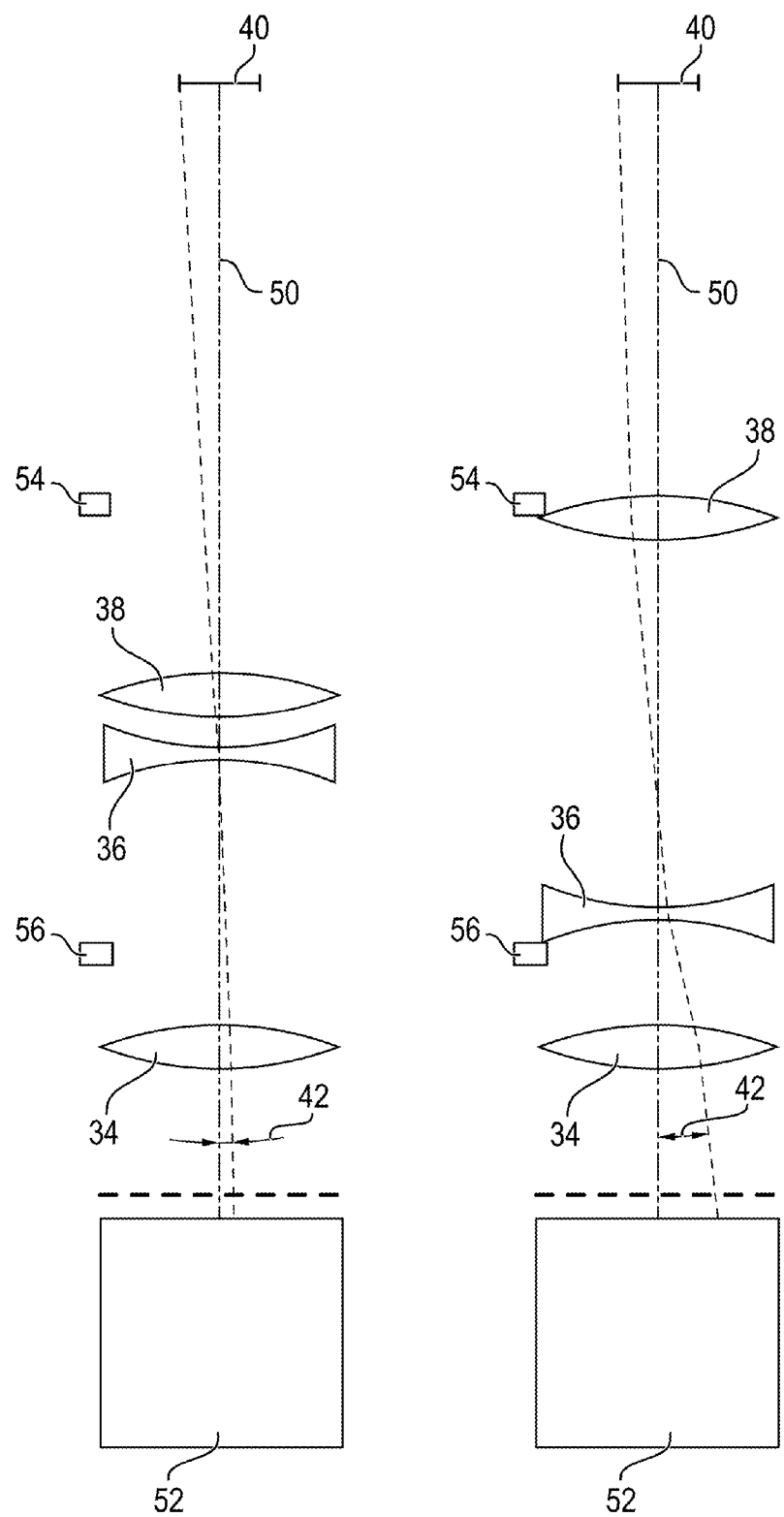

FIG. 4 depicts the instance in which second objective 52 is pivoted into the beam path. This objective 52 also once again encompasses limit stops 54, 56 with which the adjustment of zoom system 32 is limited to second partial zoom range 98. With this second objective 52, limit stops 54, 56 prevent lens groups 36, 38 from being moved farther apart from one another than the state shown on the right in FIG. 4, thus preventing the minimum magnification from being set.

Limiting elements 46, 48, 54, 56 are depicted merely schematically in FIGS. 3 and 4. In the specific embodiment as shown in FIGS. 6 to 19, limiting elements 46, 48, 54 56 are in particular arranged not in zoom system 32 but, as explained in further detail below, as adjustable pins 130 to 136 at the interface between objective system 30 and zoom system 32.

As depicted in FIG. 5, partial zoom ranges 96, 98 in which zoom system 32 is respectively operated are smaller than the maximum total zoom region 90, zoom system 32 also being referred to for this reason as an "overdimensioned" or "oversized" zoom system.

As compared with known microscopes in which the entire zoom region is always used, and the maximum and minimum magnification are implemented by corresponding selection of the objectives, the objectives that are used now no longer need to have such different focal lengths for the same total magnification range, as the following quantitative example is intended to illustrate:

In order to achieve, with a microscope according to the existing art, a magnification range of between 0.15× and 30× using two objectives, a first objective having a focal length of 20 and a second objective having a focal length of 250 are, for example, used. The zoom system has an adjustable focal length of between 38 and 600. The maximum magnification of 30 is achieved by using the first objective and setting the maximum focal length of the zoom system. The magnification obtained in this case is 30, using the calculation formula b=f zoom/f objective, therefore 600/20=30.

The minimum magnification of 0.15 is correspondingly obtained, using the second objective and the minimum focal length of the zoom system, as the quotient of 38 and 250.

In order to achieve the same magnification range (from 0.15× to 30×) with the microscope according to the embodiment of the invention, a zoom system 32 having an adjustable focal length of between 21 and 600 is now provided. The partial zoom range of first objective 44 is 38 to 600; the partial zoom range of the second objective is 21 to 336. First objective 44 has a focal length of 140; second objective 52 has a focal length of 20.

For a maximum magnification of 30, second objective 52 is once again used together with the maximum focal length of zoom system 32. For a minimum magnification, first objective 44 is used together with the minimum focal length of zoom system 32, the factor of 0.15 again being obtained as the quotient of 21 and 140.

The same total magnification range can thus be achieved, but the difference in focal length between objectives 44, 52 that are used ends up being appreciably less.

This has the advantage that objectives 44, 52 can be of substantially more compact and simple construction. In particular, a parfocal objective system 30 can be implemented by way of the smaller spread between the focal lengths of objectives 44, 52. In addition, the zoom factor selectable by the operator is the same for each objective 44, 52, namely a zoom factor of 16 (336/21 and 600/38) in the example recited above.

The association of partial zoom ranges with different objectives can be used not only with digital microscopes, but alternatively also with all other microscopes having an objective system and a zoom system.

Figure 6:
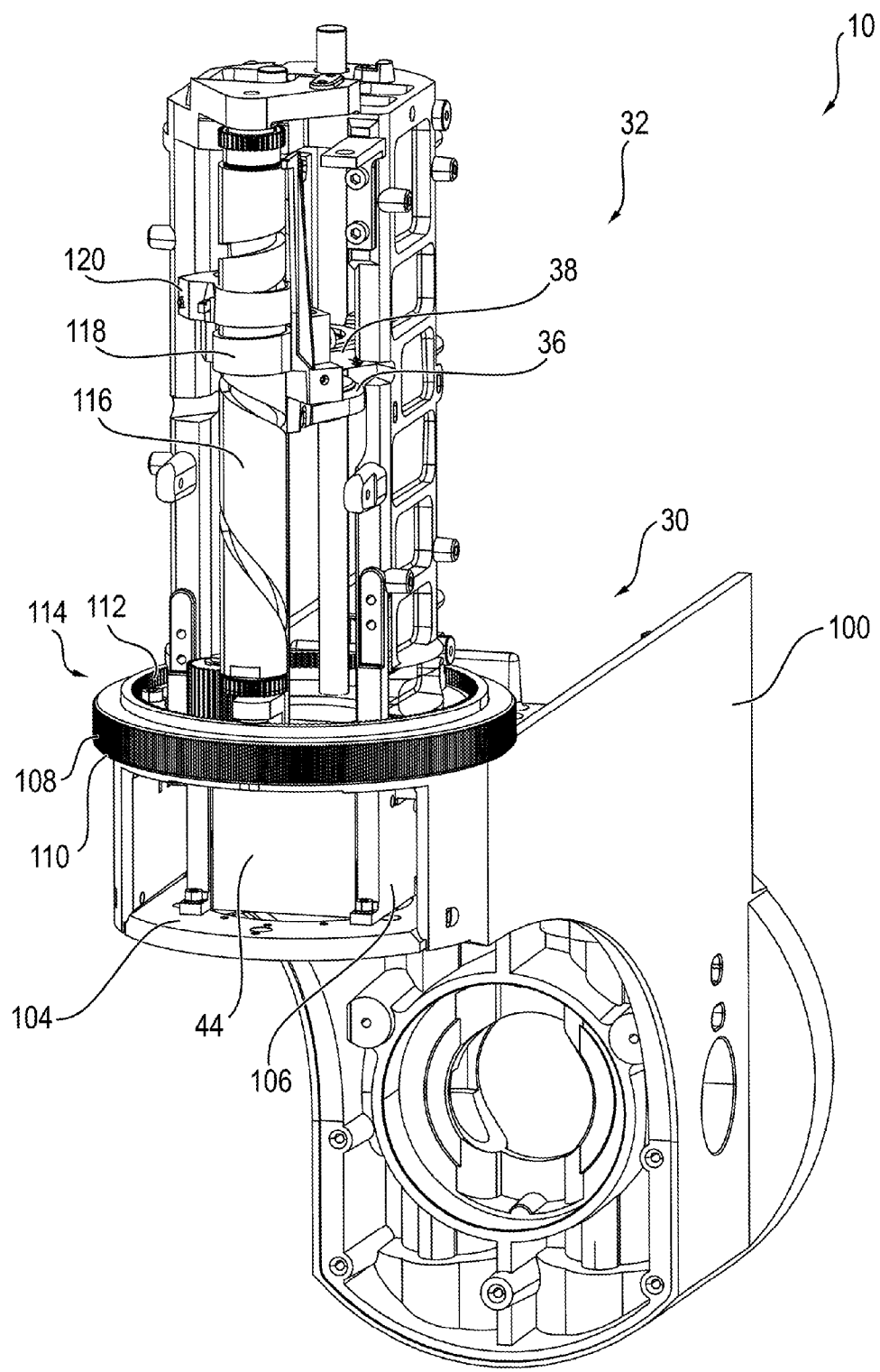
FIG. 6 is a schematic perspective depiction of a portion of the microscope according to FIG. 1.
Figure 7:
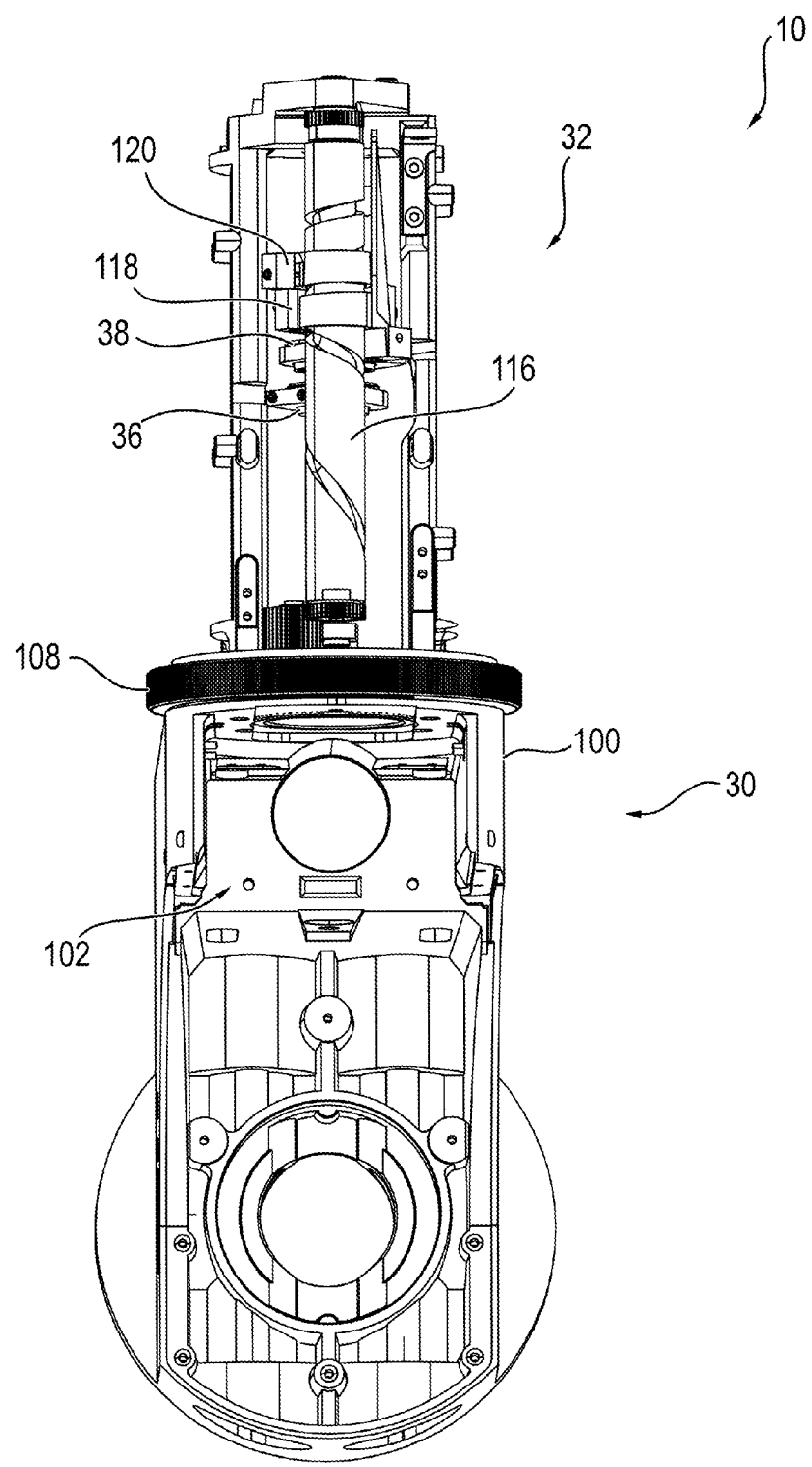
FIG. 7 is a further schematic perspective depiction of the portion according to FIG. 6.

FIGS. 6 and 7 are each schematic perspective depictions of a detail of microscope 10 according to FIG. 1, depicting a portion of zoom system 32 and of objective system 30. The depiction in FIGS. 6 and 7, and in the following Figures as well, concentrates on explaining how the adjustability of zoom system 32 is limited purely mechanically to the respective partial zoom ranges 96, 98 of the various objectives 44, 52.

Objective system 30 comprises a housing 100 in which a receiving region 102 is provided, in which region the respective objective 44 currently introduced into the beam path is received. In FIG. 7 no objective is introduced into this receiving region 102. As depicted in FIG. 6, however, an objective 44 is inserted into receiving region 102. Objective 44 is mounted on a plate 104 and is surrounded by a housing 106; plate 104 can be fastened on housing 100 of objective system 30.

Objective system 32 comprises a rotary wheel 108 that can be rotated by the operator of microscope 10. For better handling, a knurled region 110 is provided in particular on the peripheral surface of rotary wheel 108. Rotary wheel 108 has, on the side facing away from knurled region 110, a tooth set 112 with which rotary wheel 108 is in engagement, with the aid of a gear system 114, with a spindle 116. A rotation of rotary wheel 108 correspondingly causes spindle 116 to rotate.

Lens groups 36, 38 are mounted via mounts 118, 120 on spindle 116. Upon rotation of spindle 116, lens groups 96, 38 are correspondingly moved toward or away from each other.

FIGS. 8 and 9 are each schematic perspective depictions of housing 100 of objective system 30. A total of four pins 130 to 136 are arranged in housing 100, movably in the direction of double arrow P2, in particular vertically. Pins 130 to 136 are movable between an activated and a deactivated position; as depicted in FIG. 8, pins 130, 134 are shown in the activated position, and pins 132, 136 in the deactivated position. In the activated position, pins 130 to 136 protrude a predetermined distance out of surface 138 of housing 100 toward rotary wheel 108. In the deactivated position, pins 130 to 136 are arranged inside housing 100 and, in particular, do not protrude out of it. Alternatively, in the deactivated position they can also protrude slightly out of housing 100 but not as far as in the activated position.

As shown in FIG. 10, pins 130 to 136 are each biased into the activated position via a spring 140.

Each of pins 130 to 136 is furthermore respectively connected to a pin 142 to 148. As shown in FIG. 9, these pins 142 to 146 protrude into receiving region 102 and are each guided in an elongated hole of housing 100.

Pins 130 to 136 can be moved by a movement of pins 142 to 148, against the return force of spring 140, from the activated into the deactivated position. For this, pins 142 to 148 must be moved downward in the direction of arrow P3. As depicted in FIG. 9, pins 144, 148 are moved downward against the return force of the respective spring so that the associated pins 132, 136 are correspondingly arranged in the deactivated position as shown in FIG. 8.

Pins 142, 148 are moved, with the aid of objective 44 respectively introduced into receiving region 102, by contact with the corresponding objective housing 106. FIG. 11 schematically depicts a portion of first objective 44. Two contact elements 150, 152 are provided on housing 106 of objective 44, on oppositely located sides of objective housing 106. The two contact elements 150, 152 each have a stepped contact surface 154. When objective 44 is inserted into receiving region 102, pins 142 to 148 are then (as shown in FIG. 10) moved downward, provided that in the region of the respective pin 142 to 148 the respective contact element 150, 152 has, on contact surface 154, a corresponding step that moves the corresponding pin 142 to 148 downward and holds it in that position. Pins 130 to 136 are correspondingly adjusted via pins 142 to 148 between the activated and the deactivated position.

Contact elements 150, 152 are embodied differently depending on the objective 44, 52 so that different pins 130 to 136 are arranged in the activated or deactivated position.

FIGS. 12 and 13 are each schematic perspective depictions of zoom system 32, depicting different rotational positions.

A gate disk 160 is nonrotatably arranged on rotary wheel 108, on the side facing toward objective system 30 and thus toward housing 100 of objective system 30. Provided in this gate disk 160 are two circular-segment-shaped gates 162, 164 into which pins 130 to 136 can engage if they are respectively arranged in the activated position. Gate disk 160 furthermore comprises a projection 166 with which the rotatability of rotary wheel 108 is limited to a maximum rotation range. Two limit stops 172, 174 are provided for this purpose on a nonrotatable housing part 170 that is not rotated together with rotary wheel 108.

In the rotational position shown in FIG. 12, projection 166 rests against first limit stop 172 so that the handwheel can be rotated only in the direction of arrow P4. This position is referred to in particular as the "0°" rotational position.

In FIG. 13, conversely, projection 166 rests against second limit stop 174, so that the handwheel can be rotated only in the direction of arrow P5, this rotation direction P5 being opposite to rotation direction P4. In this second state, rotary wheel 160 is maximally rotated with respect to the 0° position shown in FIG. 12. This corresponds in particular to a rotation through an angle of 130°. The maximum rotation range of the handwheel is thus 130°. The total zoom range is defined by this maximum rotation range.

Because of the arrangement of pins 130 to 136 in the activated position, and the engagement thereby brought about into one of the two gates 162, 164, the rotatability of rotary wheel 108 can be restricted depending on the objective 44 that is inserted, so that depending on objective 44, 52, handwheel 108 can be rotated only in a partial rotation range that represents a partial range of the maximum rotation range. The partial zoom range is thus correspondingly established by way of these partial rotation ranges, since a restriction of the rotation range of the handwheel automatically signifies a restriction of the available zoom range.

FIGS. 14 to 19 depict by way of example, for an objective system 30 having three different objectives, the manner in which a different partial rotation range of rotary wheel 108 is defined for each of the three objectives by the differing arrangement of pins 130, 132 in the respectively activated or deactivated position due to the differing embodiment of contact elements 150, 152 of the various objectives, and a different partial zoom range is thus associated with the respective objective.

FIGS. 14 and 15 depict the situation that results when a first objective is inserted in receiving region 102; with this first objective, pin 132 is arranged in the activated position and pins 130 to 136 in the deactivated position. As shown in FIGS. 14 and 15, pin 132 thus engages into gate 162. Handwheel 108 can here be rotated between the 0° rotational position shown in FIG. 14, and the 112° rotational position shown in FIG. 15. A rotation beyond 112° is not possible because pin 132 comes to a stop against the end region of gate 162.

Alternatively, the other pins 130, 134, 136 could also be arranged in the activated position. In this case pins 134, 136 would firstly rest on the surface of gate disk 160 and, upon a slight rotation out of the 0° position, would then snap into gate 164. Movement back into the initial position would then not be possible.

FIGS. 16 and 17 depict the situation that results when a second objective is introduced into receiving region 102 in place of the first objective; with this second objective pins 130, 136 are arranged in the activated position and pins 132, 134 in the deactivated position. Thanks to the engagement of pin 136 into gate 164, the rotatability of rotary wheel 108 for the second objective is limited to a minimum rotation angle of 9°. Further rotation in direction P5, i.e. to the 0° rotation position, is not possible.

In the opposite direction P4, rotation is limited to a rotation angle of 121° by the engagement of pin 130, arranged in the activated position, into gate 164.

FIGS. 18 and 19 show the situation that results when a third objective is inserted into receiving region 102. With this third objective, contact elements 150 and 152 are embodied in such a way that the pin 134 is arranged in the activated position and the pins 130, 132, 136 are arranged in the deactivated position. Thanks to the engagement of pin 134 into gate 164, the rotatability of rotary wheel 108 in direction P5 is limited to 18° as a minimum rotation angle. In direction P4, conversely, rotary wheel 108 can be rotated until projection 166 comes to a stop against second limit stop 174, i.e. to the maximum rotation angle of 130°.

By way of the above-described arrangement having pins 130 to 136 that engage into the corresponding gates 162, 164 it is thus possible to limit the rotatability of rotary wheel 108, simply and purely mechanically, as a function of the objective 44, 52, so that a partial zoom range within the total zoom range can simply and reliably be associated with each objective 44, 52.

In an alternative embodiment, more or fewer than four pins 130, 136 can also be provided. Alternatively, more or fewer than two gates 162, 164 can also be provided. The number of pins and gates can in particular be adapted to the number of different objectives being used, and thus to the number of different partial zoom ranges required.

PARTS LIST

- 10 Microscope
- 12 Stand body
- 14 Pivot unit
- 16 Housing
- 18 Stage
- 20 Adjusting wheel
- 30 Objective system
- 32 Zoom system
- 34, 36, 38 Lens group
- 40 Image sensing unit
- 42 Field angle
- 44, 52 Objective
- 46, 48, 54, 56 Limiting element
- 50 Optical axis
- 90 Total zoom range
- 92 Lower limit
- 94 Upper limit
- 96, 98 Partial zoom range
- 100 Housing
- 102 Receiving region
- 104 Plate
- 106 Objective housing
- 108 Rotary wheel
- 110 Knurled region
- 112 Tooth set
- 114 Gear arrangement
- 116 Spindle
- 118, 120 Holding element
- 130 to 136 Pin
- 138 Surface
- 140 Spring
- 142, 148 Pin
- 150, 152 Contact element
- 154 Contact surface
- 160 Gate disk
- 162, 164 Gate
- 166 Projection
- 170 Housing part
- 172, 174 Limit stop
- P1 to P5 Direction

What is claimed is:

1. A microscope (10) comprising:
   an objective system (30) including at least two objectives (44, 52) selectably introducible into a beam path and having different focal lengths, and a receiving region (102) for receiving the objective (44, 52) introduced into the beam path;
   a zoom system (32) having a total zoom range (90), the zoom system (32) being adjustable to a selected zoom magnification within the total zoom range (90);
   a respective total magnification of an object to be examined microscopically being obtained respectively from the focal length of the selected objective (44, 52) and the selected zoom magnification of the zoom system (32); and a manually rotatable rotary wheel (108) for adjusting the zoom magnification of the zoom system (32), the rotary wheel (108) being rotatable relative to a nonrotatable housing (100) of the microscope within a predetermined maximum rotation range, and the total zoom range (90) being defined by the maximum rotation range, the rotary wheel (108) including a first engagement element (162, 164), at least one second engagement element (130 to 136, 142 to 148) being movably mounted on the housing (100), the second engagement element (130 to 136, 142 to 148) in a deactivated position not being in engagement with the first engagement element (162, 164) and in an activated position being in engagement with the first engagement element (162, 164), the engagement limiting the rotatability of the rotary wheel (108) to a partial rotation range that is a partial range of the maximum rotation range, and a position of the second engagement element (130 to 136, 142 to 148) being determined by the respective objective (44, 52) currently received in the receiving region (102).

2. The microscope (10) according to claim 1, wherein the position of the second engagement element (130 to 136, 142 to 148) is established via contact with a contact surface (154) of the respective objective (44, 52) currently received in the receiving region (102).

3. The microscope (10) according to claim 2, wherein a first objective (44) and a second objective (52) each comprising a respective contact surface (154) are provided, the contact surface (154) of the first objective (44) being embodied such that when the first objective (44) is received in the receiving region (102), the second engagement element (130 to 136, 142 to 148) is arranged in the activated position, and the contact surface (154) of the second objective (52) being embodied in such a way that when the second objective (52) is received in the receiving region (102), the second engagement element (130 to 136, 142 to 148) is arranged in the deactivated position.

4. The microscope (10) according to claim 3, wherein the second engagement element (130 to 136, 142 to 148) is biased by an elastic element (140) into the activated position, and is held in the deactivated position by the second objective (52) when the second objective (52) is received in the receiving region (102).

5. The microscope (10) according to claim 4, wherein the elastic element (140) includes a spring.

6. The microscope (10) according to claim 4, wherein the contact surface (154) of the first objective (44) is embodied such that when the first objective (44) is introduced into the receiving region (102), the second engagement element (130 to 136, 142 to 148) is not contacted by the contact surface (154) of the first objective (44), and the contact surface (154) of the second objective (52) is embodied such that when the second objective (52) is introduced into the receiving region (102), the second engagement element (130 to 136, 142 to 148) contacts the contact surface (154) of the second objective (44, 52) and, via that contact, is moved against the bias of the elastic element (140) from the activated position into the deactivated position.

7. The microscope (10) according to claim 3, wherein the contact surface (154) of the first objective (44) or the contact surface (154) of the second objective (52) is step-shaped.

8. The microscope according to claim 1, wherein the first engagement element (162, 164) comprises a gate (162, 164) and the second engagement element (130 to 136, 142 to 148) comprises a pin (130 to 136), such that in the activated position the pin (130 to 136) engages into the gate (162, 164).

9. The microscope (10) according to claim 8, wherein the second engagement element (130 to 136, 142 to 148) includes a connecting element (142 to 148) connected to the pin (130 to 136), wherein the connecting element (142 to 148) is contacted and moved by the contact surface (154) of the objective (44, 52) currently received in the receiving region (102).

10. The microscope (10) according claim 1, wherein a plurality of the second engagement elements (130 to 136, 142 to 148) are provided, the plurality of the second engagement elements respectively in a deactivated position are not in engagement with the first engagement element (162, 164) and in an activated position are in engagement with the first engagement element (162, 164), the rotatability of the rotary wheel (108) being respectively limited by the engagement to a partial rotation range that is a partial range of the maximum rotation range; and the respective objective (44, 52) currently arranged in the receiving region (102) determining which of the second engagement elements (130 to 136, 142 to 148) are arranged in the activated position and which of the second engagement elements (130 to 136, 142 to 148) are arranged in the deactivated position.

11. The microscope (10) according to claim 10, wherein the first engagement element (162, 164) includes a first gate (162) and a second gate (164), and the plurality of second engagement elements includes four pins (130 to 136), two of the four pins (130 to 136) engaging into the first gate (162) in the activated position, and the other two of the four pins (130 to 136) engaging into the second gate (164) in the activated position.

12. The microscope (10) according to claim 11, wherein a plurality of objectives (44, 52) are provided, and each of the plurality of objectives defines a different combination of the pins (130 to 136, 142 to 148) in the activated or the deactivated position when the respective objective (44, 52) is received in the receiving region (102).

13. The microscope (10) according to claim 10, wherein the plurality of second engagement elements (130 to 136, 142 to 148) includes a first pin (132), a second pin (130), a third pin (136), and a fourth pin (134), wherein when a first objective (44, 52) is received in the receiving region (102), the first pin (132) is arranged in the activated position and the second, third, and fourth pins (130, 136, 134) are arranged in the deactivated position; when a second objective (44, 52) is arranged in the receiving region (102), the second and the third pins (130, 136) are arranged in the activated position and the first and the fourth pins (132, 134) are arranged in the deactivated position; and when a third objective (44, 52) is received in the receiving region (102), the fourth pin (134) is arranged in the activated position and the first, second, and third pins (132, 130, 136) are arranged in the deactivated position.

14. The microscope (10) according to claim 1, wherein a first and a second stationary limit stop (172, 174) are provided in order to limit the maximum rotation range.

15. The microscope (10) according to claim 1, wherein the second engagement element (130 to 136, 142 to 148) is linearly displaceable between the activated position and the deactivated position.

* * * * *